US012587683B2

(12) United States Patent
Joshi et al.

(10) Patent No.: US 12,587,683 B2
(45) Date of Patent: Mar. 24, 2026

(54) PACKING DISPLACEMENT COMPONENT SAMPLE IN THE DISPLACEMENT VIDEO FRAME FOR DYNAMIC MESH CODING

(71) Applicant: Samsung Electronics Co., Ltd., Suwon-si (KR)

(72) Inventors: Rajan Laxman Joshi, San Diego, CA (US); Madhukar Budagavi, Plano, TX (US)

(73) Assignee: Samsung Electronics Co., Ltd., Suwon-si (KR)

( * ) Notice: Subject to any disclaimer, the term of this patent is extended or adjusted under 35 U.S.C. 154(b) by 148 days.

(21) Appl. No.: 18/638,565

(22) Filed: Apr. 17, 2024

(65) Prior Publication Data

US 2024/0357177 A1     Oct. 24, 2024

Related U.S. Application Data

(60) Provisional application No. 63/522,348, filed on Jun. 21, 2023, provisional application No. 63/462,379, filed on Apr. 27, 2023, provisional application No. 63/461,368, filed on Apr. 24, 2023, provisional application No. 63/461,089, filed on Apr. 21, 2023.

(51) Int. Cl.
*H04N 7/12* (2006.01)
*G06T 9/00* (2006.01)
(Continued)

(52) U.S. Cl.
CPC ............. *H04N 19/64* (2014.11); *G06T 9/001* (2013.01); *H04N 19/126* (2014.11); (Continued)

(58) Field of Classification Search
CPC ................................................... H04N 19/176
See application file for complete search history.

(56) References Cited

U.S. PATENT DOCUMENTS

| | | |
|---|---|---|
| 11,935,272 B2 | 3/2024 | Mammou et al. |
| 12,149,717 B2 | 11/2024 | Zhang et al. |
| 2021/0211697 A1 | 7/2021 | Skupin et al. |

FOREIGN PATENT DOCUMENTS

| | | |
|---|---|---|
| KR | 10-1202630 B1 | 11/2012 |
| KR | 10-2019-0089115 A | 7/2019 |

(Continued)

OTHER PUBLICATIONS

Joshi, Rajan et al. "[V-DMC] Padding and partial decoding of displacements" ISO/IEC SC29 WG07 m63491, Antalya—Apr. 2023.

(Continued)

*Primary Examiner* — Y Lee

(57)     ABSTRACT

An apparatus receives a compressed bitstream including an encoded displacements bitstream and packing method information indicating whether the displacement component samples are packed in ascending order or in descending order. The apparatus video-decodes the encoded displacements bitstream to generate a displacement video frame, wherein padding is added at a bottom of the displacement video frame irrespective of whether the displacement component samples are packed in ascending order or in descending order. The apparatus image-unpacks the displacement video frame to generate an array of quantized displacement wavelet coefficients, inverse-quantizes the array of quantized displacement wavelet coefficients to generate displacement wavelet coefficients, and inverse-wavelet-transforms the displacement wavelet coefficients to generate displacement component samples.

20 Claims, 13 Drawing Sheets

(51) Int. Cl.

| | | |
|---|---|---|
| *H04N 19/126* | (2014.01) | |
| *H04N 19/129* | (2014.01) | |
| *H04N 19/167* | (2014.01) | |
| *H04N 19/176* | (2014.01) | |
| *H04N 19/64* | (2014.01) | |

(52) U.S. Cl.
CPC ......... *H04N 19/129* (2014.11); *H04N 19/167* (2014.11); *H04N 19/176* (2014.11)

(56) References Cited

FOREIGN PATENT DOCUMENTS

| KR | 10-2154443 | B1 | 9/2020 |
|----|------------|----|--------|
| KR | 10-2020-0119877 | A | 10/2020 |
| KR | 10-2401373 | B1 | 5/2022 |
| KR | 10-2022-0126225 | A | 9/2022 |

OTHER PUBLICATIONS

Graziosi, Danillo B., et al. "[V-DMC][NEW] New packing proposal for displacement" ISO/IEC SC29 WG07 m63331, Antalya—Apr. 2023.

Zakharchenko, Vladyslav et al. "[V-DMC] Separable LoD displacement packing in displacement video frames" ISO/IEC JTC 1/SC 29/WG 7 m61012, Mainz, DE—Oct. 2022.

Afnor. "V-DMC Test Model v3 (TMM v3)" ISO/IEC SC29 WG07 N00530, Jan. 2023.

Afnor. "WD 3.0 of V-DMC" ISO/IEC SC29 WG07 N00611, Apr. 2023.

International Search Report for PCT/KR2024/005425 by Korean Intellectual Property Office dated Aug. 1, 2024.

FIG. 5

UPPER AREA

LOWER AREA

PADDED ROWS lod2 lod1 lod0

UPPER AREA

LOWER AREA

PADDED ROWS lod2 lod1 lod0

| | |
|---|---|
| ▨ | lod2 |
| ▨ | lod1 |
| ▨ | lod0 |
| ▨ | padding |
| ▨ | Block with mix of lod2 data and padding |

| | |
|---|---|
| ▨ | lod2 |
| ▨ | lod1 |
| ▨ | lod0 |
| ▨ | padding |
| ▨ | Block with mix of lod0 data and padding |

PACKING DISPLACEMENT COMPONENT SAMPLE IN THE DISPLACEMENT VIDEO FRAME FOR DYNAMIC MESH CODING

CROSS REFERENCE TO RELATED APPLICATION

This application claims benefit of U.S. Provisional Application No. 63/461,089 filed on Apr. 21, 2023, U.S. Provisional Application No. 63/461,368 filed on Apr. 24, 2023, U.S. Provisional Application No. 63/462,379 filed on Apr. 27, 2023, and U.S. Provisional Application No. 63/522,348 filed on Jun. 21, 2023, in the United States Patent and Trademark Office, the entire contents of which are hereby incorporated by reference.

TECHNICAL FIELD

The disclosure relates to improvements to dynamic mesh coding, and more particularly to, for example, but not limited to, improvements to packing displacement component samples in the displacement video frame for dynamic mesh coding and improvements to padding of displacement video frames for dynamic mesh coding.

BACKGROUND

Typically mesh encoding and decoding operations may be highly sequential. A base mesh may be divided into multiple submeshes. Each decoded submesh may undergo subdivision and then the decoded displacement field may be used to refine the positions of the subdivided points belonging to that submesh.

Displacement component samples may be wavelet-transformed to displacement wavelet coefficients. The displacement wavelet coefficients may be quantized and quantized displacement wavelet coefficients may be packed in a displacement video frame. When the size of the displacement video frame varies temporally, some frames need be padded to make the frame size constant.

The description set forth in the background section should not be assumed to be prior art merely because it is set forth in the background section. The background section may describe aspects or embodiments of the present disclosure.

SUMMARY

When reversible packing is used, in some embodiments, padding rows of samples may be added at the top of the frame. When padding is at the top of the frame, to decode only certain level of detail signals, it is necessary to decode the padded samples, thereby resulting in unnecessary computations. Also, the arithmetic coding models may take longer to adapt.

In some embodiments, padded rows may be added at the bottom of the frame irrespective of whether reversible packing is used.

In some embodiments proposes a packing mechanism which makes it possible for the different level of detail signals to be included in different slices, thereby enabling partial or independent decoding of displacement data.

In some embodiments, an apparatus comprises: a communication interface configured to receive a compressed bitstream including an encoded displacements bitstream and packing method information indicating whether the displacement component samples are packed in ascending order or in descending order, wherein the displacement component samples are packed in ascending order when the packing method information is equal to a first value, and the displacement component samples are packed in descending order when the packing method information is equal to a second value, wherein the first value is 0 and the second value is 1; and a processor operably coupled to the communication interface. The processor is configured to cause: decoding the packing method information; video-decoding the encoded displacements bitstream to generate a displacement video frame; image-unpacking the displacement video frame to generate an array of quantized displacement wavelet coefficients, wherein the displacement video frame includes padding at a lower area of the displacement video frame irrespective of whether the displacement component samples are packed in descending order; inverse-quantizing the array of quantized displacement wavelet coefficients to generate displacement wavelet coefficients; and inverse-wavelet-transforming the displacement wavelet coefficients to generate displacement component samples.

In some embodiments, irrespective of whether the packing method information indicates that the displacement component samples are packed in descending order, an upper area of the displacement video frame includes quantized displacement wavelet coefficients and the lower area of the displacement video frame does not include any quantized displacement wavelet coefficient and includes samples for padding.

In some embodiments, image-unpacking the displacement video frame starts from a bottom-right block of the upper area if the packing method information indicates that the displacement component samples are packed in descending order.

In some embodiments, the bottom-right block of the upper area includes quantized displacement wavelet coefficients belonging to the lowest level of detail (LOD).

In some embodiments, a plurality of packing blocks are placed in the displacement video frame.

In some embodiments, the plurality of packing blocks includes one or more non-padded blocks and a partially padded block, each of the one or more non-padded blocks include quantized displacement wavelet coefficients belonging to a first level of detail (LOD) and do not include any samples for padding, and the partially padded block includes one or more quantized displacement wavelet coefficients belonging to the first LOD and one or more samples for padding.

In some embodiments, the one or more non-padded blocks precede the partially padded block in scan order of blocks, when the packing method information indicates that the displacement component samples are packed in descending order.

In some embodiments, the scan order of blocks is reverse raster scan.

In some embodiments, the partially padded block precedes one or more fully padded blocks, each of the one or more fully padded blocks does not include any quantized displacement wavelet coefficient to be decoded and includes samples for padding.

In some embodiments, each of the one or more non-padded blocks is not allowed to include quantized displacement wavelet coefficients belonging to a second LOD, the second LOD being different from the first LOD.

In some embodiments, a plurality of packing blocks are placed in the displacement video frame and the size of the plurality of packing blocks is an integer multiple of the size of a unit block used for configuring a partially or independently decodable region for a video coding standard used by the video-decoding, the integer being equal to or greater than 1.

In some embodiments, the partially or independently decodable region for a video coding standard used by the video-decoding is not allowed to include quantized displacement wavelet coefficients belonging to two or more levels of detail.

In some embodiments, the size of the unit block is the size of a coding tree unit specified in the video-decoding, when the video-decoding uses the High Efficiency Video Coding (HEVC).

In some embodiments, the size of the unit block is the size of a macroblock specified in the video-decoding, when the video-decoding uses the Advanced Video Coding (AVC).

In some embodiments, a method comprises: receiving a compressed bitstream including an encoded displacements bitstream and packing method information indicating whether the displacement component samples are packed in ascending order or in descending order, wherein the displacement component samples are packed in ascending order when the packing method information is equal to a first value, and the displacement component samples are packed in descending order when the packing method information is equal to a second value, wherein the first value is 0 and the second value is 1; decoding the packing method information; video-decoding the encoded displacements bitstream to generate a displacement video frame; image-unpacking the displacement video frame to generate an array of quantized displacement wavelet coefficients, wherein the displacement video frame includes padding at a lower area of the displacement video frame irrespective of whether the displacement component samples are packed in descending order; inverse-quantizing the array of quantized displacement wavelet coefficients to generate displacement wavelet coefficients; and inverse-wavelet-transforming the displacement wavelet coefficients to generate displacement component samples.

In some embodiments, an apparatus comprises: a communication interface; and a processor operably coupled to the communication interface. The processor is configured to cause: encoding packing method information indicating whether the displacement component samples are packed in ascending order or in descending order, wherein the displacement component samples are packed in ascending order when the packing method information is equal to a first value, and the displacement component samples are packed in descending order when the packing method information is equal to a second value, wherein the first value is 0 and the second value is 1; wavelet-transforming displacement component samples to generate displacement wavelet coefficients; quantizing the displacement wavelet coefficients to generate an array of quantized displacement wavelet coefficients; image-packing the array of quantized displacement wavelet coefficients to generate a displacement video frame, wherein padding is added at a lower area of the displacement video frame irrespective of whether the displacement component samples are packed in descending order; video-encoding the displacement video frame to generate an encoded displacements bitstream; and combining the encoded packing method information and the encoded displacements bitstream into a compressed bitstream.

In some embodiments, when the packing method information indicates that the displacement component samples are packed in descending order, an upper area of the displacement video frame includes quantized displacement wavelet coefficients and a lower area of the displacement video frame does not include any quantized displacement wavelet coefficient and includes samples for padding.

In some embodiments, image-packing the displacement video frame starts from a bottom-right block of the upper area if the packing method information indicates that the displacement component samples are packed in descending order.

In some embodiments, the bottom-right block of the upper area includes quantized displacement wavelet coefficients belonging to the lowest level of detail (LOD).

In some embodiments, a plurality of packing blocks are placed in the displacement video frame and the size of the plurality of packing blocks is an integer multiple of the size of a unit block used for configuring a partially or independently decodable region for a video coding standard used by the video-decoding, the integer being equal to or greater than 1.

BRIEF DESCRIPTION OF THE DRAWINGS

FIG. 5 illustrates a block diagram for a decoder in accordance with an embodiment.

Figure 1:
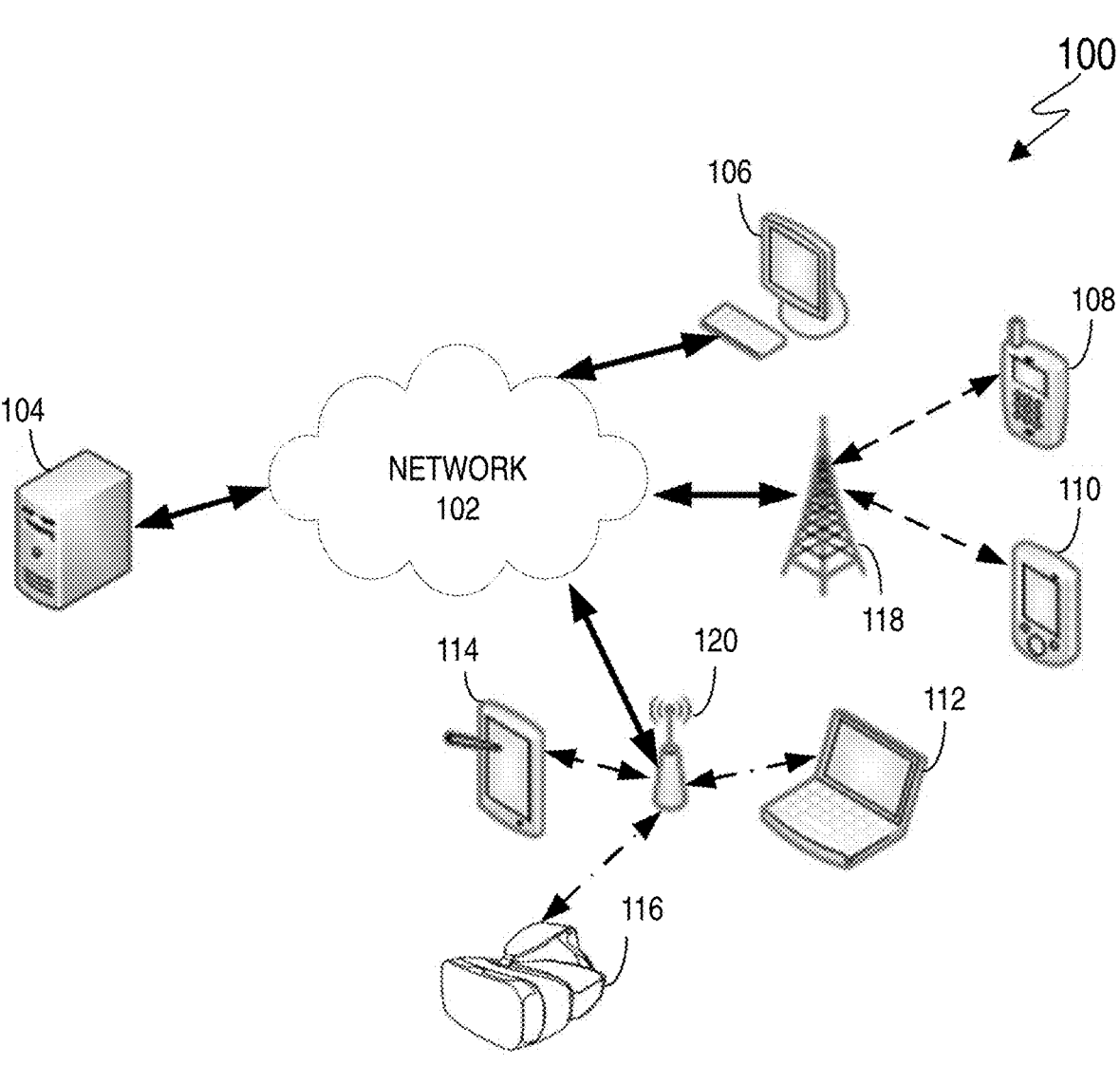
FIG. 1 illustrates an example communication system 100 in accordance with an embodiment of this disclosure.

In one or more implementations, not all of the depicted components in each figure may be required, and one or more implementations may include additional components not shown in a figure. Variations in the arrangement and type of the components may be made without departing from the scope of the subject disclosure. Additional components, different components, or fewer components may be utilized within the scope of the subject disclosure.

DETAILED DESCRIPTION

The detailed description set forth below, in connection with the appended drawings, is intended as a description of various implementations and is not intended to represent the only implementations in which the subject technology may be practiced. Rather, the detailed description includes specific details for the purpose of providing a thorough understanding of the inventive subject matter. As those skilled in the art would realize, the described implementations may be modified in various ways, all without departing from the scope of the present disclosure. Accordingly, the drawings and description are to be regarded as illustrative in nature and not restrictive. Like reference numerals designate like elements.

Three hundred sixty degree (360°) video and 3D volumetric video are emerging as new ways of experiencing immersive content due to the ready availability of powerful handheld devices such as smartphones. While 360° video enables immersive "real life," "being there" experience for consumers by capturing the 360° outside-in view of the world, 3D volumetric video can provide complete 6DoF experience of being and moving within the content. Users can interactively change their viewpoint and dynamically view any part of the captured scene or object they desire. Display and navigation sensors can track head movement of the user in real-time to determine the region of the 360° video or volumetric content that the user wants to view or interact with. Multimedia data that is three-dimensional (3D) in nature, such as point clouds or 3D polygonal meshes, can be used in the immersive environment.

A point cloud is a set of 3D points along with attributes such as color, normal, reflectivity, point-size, etc. that represent an object's surface or volume. Point clouds are common in a variety of applications such as gaming, 3D maps, visualizations, medical applications, augmented reality, virtual reality, autonomous driving, multi-view replay, 6DoF immersive media, to name a few. Point clouds, if uncompressed, generally require a large amount of bandwidth for transmission. Due to the large bitrate requirement, point clouds are often compressed prior to transmission. To compress a 3D object such as a point cloud, often requires specialized hardware. To avoid specialized hardware to compress a 3D point cloud, a 3D point cloud can be transformed into traditional two-dimensional (2D) frames and that can be compressed and later be reconstructed and viewable to a user.

Polygonal 3D meshes, especially triangular meshes, are another popular format for representing 3D objects. Meshes typically consist of a set of vertices, edges and faces that are used for representing the surface of 3D objects. Triangular meshes are simple polygonal meshes in which the faces are simple triangles covering the surface of the 3D object. Typically, there may be one or more attributes associated with the mesh. In one scenario, one or more attributes may be associated with each vertex in the mesh. For example, a texture attribute (RGB) may be associated with each vertex. In another scenario, each vertex may be associated with a pair of coordinates, (u, v). The (u, v) coordinates may point to a position in a texture map associated with the mesh. For example, the (u, v) coordinates may refer to row and column indices in the texture map, respectively. A mesh can be thought of as a point cloud with additional connectivity information.

The point cloud or meshes may be dynamic, i.e., they may vary with time. In these cases, the point cloud or mesh at a particular time instant may be referred to as a point cloud frame or a mesh frame, respectively.

Since point clouds and meshes contain a large amount of data, they require compression for efficient storage and transmission. This is particularly true for dynamic point clouds and meshes, which may contain 60 frames or higher per second.

Figures discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably-arranged system or device.

FIG. 1 illustrates an example communication system 100 in accordance with an embodiment of this disclosure. The embodiment of the communication system 100 shown in FIG. 1 is for illustration only. Other embodiments of the communication system 100 can be used without departing from the scope of this disclosure.

The communication system 100 includes a network 102 that facilitates communication between various components in the communication system 100. For example, the network 102 can communicate IP packets, frame relay frames, Asynchronous Transfer Mode (ATM) cells, or other information between network addresses. The network 102 includes one or more local area networks (LANs), metropolitan area networks (MANs), wide area networks (WANs), all or a portion of a global network such as the Internet, or any other communication system or systems at one or more locations.

In this example, the network 102 facilitates communications between a server 104 and various client devices 106-116. The client devices 106-116 may be, for example, a smartphone, a tablet computer, a laptop, a personal computer, a TV, an interactive display, a wearable device, a HMD, or the like. The server 104 can represent one or more servers. Each server 104 includes any suitable computing or processing device that can provide computing services for one or more client devices, such as the client devices 106-116. Each server 104 could, for example, include one or more processing devices, one or more memories storing instructions and data, and one or more network interfaces facilitating communication over the network 102. As described in more detail below, the server 104 can transmit a compressed bitstream, representing a point cloud or mesh, to one or more display devices, such as a client device 106-116. In certain embodiments, each server 104 can include an encoder.

Each client device 106-116 represents any suitable computing or processing device that interacts with at least one server (such as the server 104) or other computing device(s) over the network 102. The client devices 106-116 include a desktop computer 106, a mobile telephone or mobile device 108 (such as a smartphone), a PDA 110, a laptop computer 112, a tablet computer 114, and a HMD 116. However, any other or additional client devices could be used in the communication system 100. Smartphones represent a class of mobile devices 108 that are handheld devices with mobile operating systems and integrated mobile broadband cellular network connections for voice, short message service (SMS), and Internet data communications. The HMD 116 can display 360° scenes including one or more dynamic or static 3D point clouds. In certain embodiments, any of the client devices 106-116 can include an encoder, decoder, or both. For example, the mobile device 108 can record a 3D volumetric video and then encode the video enabling the video to be transmitted to one of the client devices 106-116. In another example, the laptop computer 112 can be used to generate a 3D point cloud or mesh, which is then encoded and transmitted to one of the client devices 106-116.

In this example, some client devices 108-116 communicate indirectly with the network 102. For example, the mobile device 108 and PDA 110 communicate via one or more base stations 118, such as cellular base stations or eNodeBs (eNBs). Also, the laptop computer 112, the tablet computer 114, and the HMD 116 communicate via one or more wireless access points 120, such as IEEE 802.11 wireless access points. Note that these are for illustration only and that each client device 106-116 could communicate directly with the network 102 or indirectly with the network 102 via any suitable intermediate device(s) or network(s). In certain embodiments, the server 104 or any client device 106-116 can be used to compress a point cloud or mesh, generate a bitstream that represents the point cloud or mesh, and transmit the bitstream to another client device such as any client device 106-116.

In certain embodiments, any of the client devices 106-114 transmit information securely and efficiently to another device, such as, for example, the server 104. Also, any of the client devices 106-116 can trigger the information transmission between itself and the server 104. Any of the client devices 106-114 can function as a VR display when attached to a headset via brackets, and function similar to HMD 116. For example, the mobile device 108 when attached to a bracket system and worn over the eyes of a user can function similarly as the HMD 116. The mobile device 108 (or any other client device 106-116) can trigger the information transmission between itself and the server 104.

In certain embodiments, any of the client devices 106-116 or the server 104 can create a 3D point cloud or mesh, compress a 3D point cloud or mesh, transmit a 3D point cloud or mesh, receive a 3D point cloud or mesh, decode a 3D point cloud or mesh, render a 3D point cloud or mesh, or a combination thereof. For example, the server 104 can then compress 3D point cloud or mesh to generate a bitstream and then transmit the bitstream to one or more of the client devices 106-116. For another example, one of the client devices 106-116 can compress a 3D point cloud or mesh to generate a bitstream and then transmit the bitstream to another one of the client devices 106-116 or to the server 104.

Although FIG. 1 illustrates one example of a communication system 100, various changes can be made to FIG. 1. For example, the communication system 100 could include any number of each component in any suitable arrangement. In general, computing and communication systems come in a wide variety of configurations, and FIG. 1 does not limit the scope of this disclosure to any particular configuration. While FIG. 1 illustrates one operational environment in which various features disclosed in this patent document can be used, these features could be used in any other suitable system.

Figure 2:
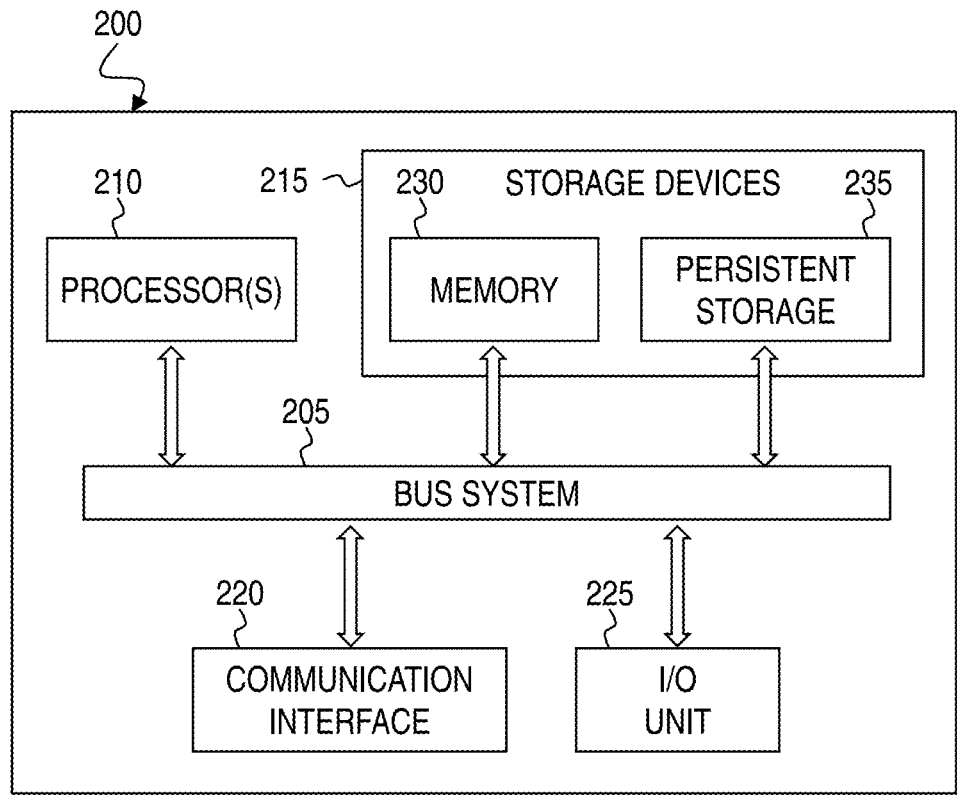
FIGS. 2 and 3 illustrate example electronic devices in accordance with an embodiment of this disclosure.
Figure 3:
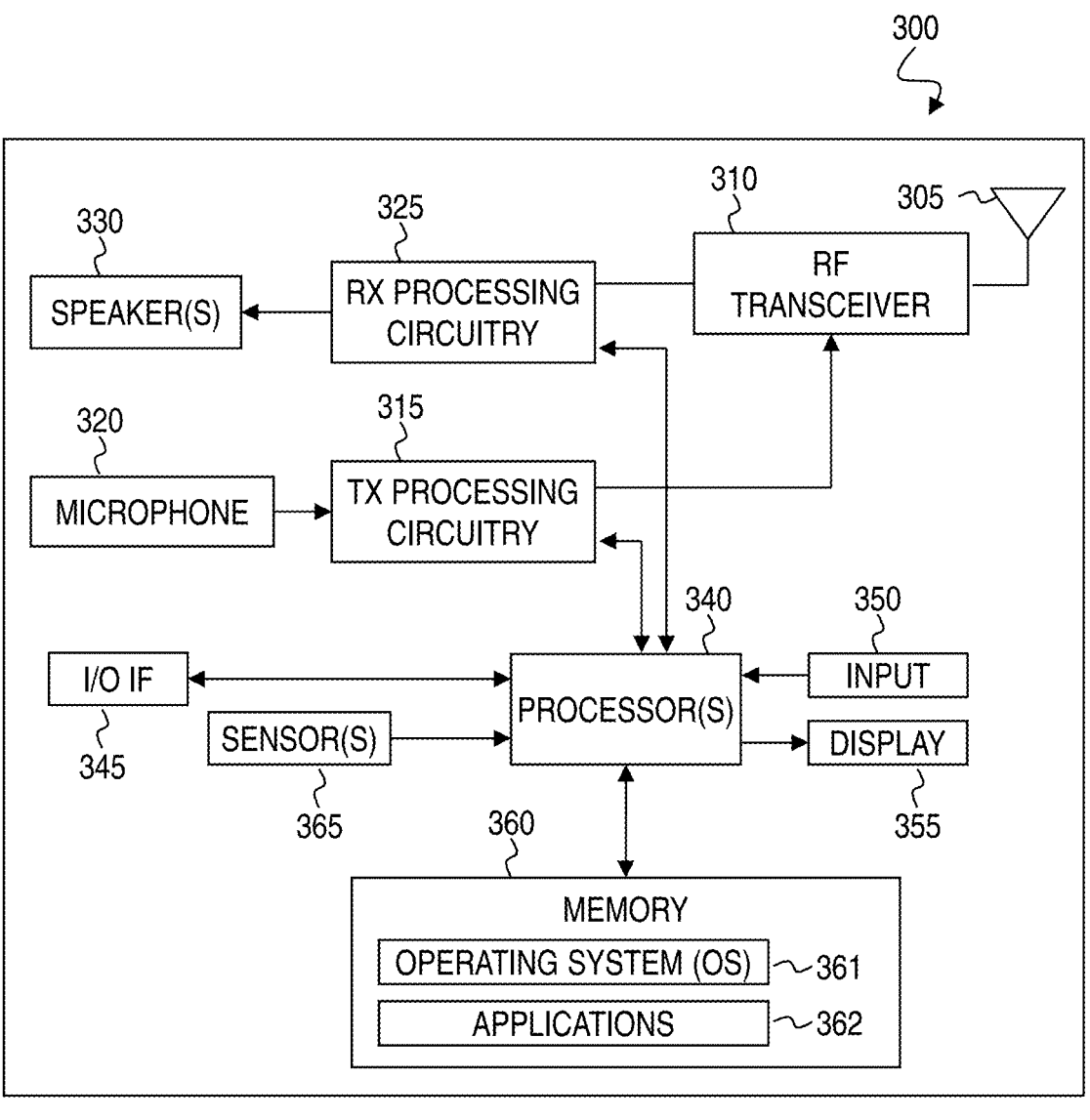

FIGS. 2 and 3 illustrate example electronic devices in accordance with an embodiment of this disclosure. In particular, FIG. 2 illustrates an example server 200, and the server 200 could represent the server 104 in FIG. 1. The server 200 can represent one or more encoders, decoders, local servers, remote servers, clustered computers, and components that act as a single pool of seamless resources, a cloud-based server, and the like. The server 200 can be accessed by one or more of the client devices 106-116 of FIG. 1 or another server.

The server 200 can represent one or more local servers, one or more compression servers, or one or more encoding servers, such as an encoder. In certain embodiments, the encoder can perform decoding. As shown in FIG. 2, the server 200 includes a bus system 205 that supports communication between at least one processing device (such as a processor 210), at least one storage device 215, at least one communications interface 220, and at least one input/output (I/O) unit 225.

The processor 210 executes instructions that can be stored in a memory 230. The processor 210 can include any suitable number(s) and type(s) of processors or other devices in any suitable arrangement. Example types of processors 210 include microprocessors, microcontrollers, digital signal processors, field programmable gate arrays, application specific integrated circuits, and discrete circuitry.

In certain embodiments, the processor 210 can encode a 3D point cloud or mesh stored within the storage devices 215. In certain embodiments, encoding a 3D point cloud also decodes the 3D point cloud or mesh to ensure that when the point cloud or mesh is reconstructed, the reconstructed 3D point cloud or mesh matches the 3D point cloud or mesh prior to the encoding.

The memory 230 and a persistent storage 235 are examples of storage devices 215 that represent any structure(s) capable of storing and facilitating retrieval of information (such as data, program code, or other suitable information on a temporary or permanent basis). The memory 230 can represent a random access memory or any other suitable volatile or non-volatile storage device(s). For example, the instructions stored in the memory 230 can include instructions for decomposing a point cloud into patches, instructions for packing the patches on 2D frames, instructions for compressing the 2D frames, as well as instructions for encoding 2D frames in a certain order in order to generate a bitstream. The instructions stored in the memory 230 can also include instructions for rendering the point cloud on an omnidirectional 360° scene, as viewed through a VR headset, such as HMD 116 of FIG. 1. The persistent storage 235 can contain one or more components or devices supporting longer-term storage of data, such as a read only memory, hard drive, Flash memory, or optical disc.

The communications interface 220 supports communications with other systems or devices. For example, the communications interface 220 could include a network interface card or a wireless transceiver facilitating communications over the network 102 of FIG. 1. The communications interface 220 can support communications through any suitable physical or wireless communication link(s). For example, the communications interface 220 can transmit a bitstream containing a 3D point cloud to another device such as one of the client devices 106-116.

The I/O unit 225 allows for input and output of data. For example, the I/O unit 225 can provide a connection for user input through a keyboard, mouse, keypad, touchscreen, or other suitable input device. The I/O unit 225 can also send output to a display, printer, or other suitable output device.

Note, however, that the I/O unit 225 can be omitted, such as when I/O interactions with the server 200 occur via a network connection.

Note that while FIG. 2 is described as representing the server 104 of FIG. 1, the same or similar structure could be used in one or more of the various client devices 106-116. For example, a desktop computer 106 or a laptop computer 112 could have the same or similar structure as that shown in FIG. 2.

FIG. 3 illustrates an example electronic device 300, and the electronic device 300 could represent one or more of the client devices 106-116 in FIG. 1. The electronic device 300 can be a mobile communication device, such as, for example, a mobile station, a subscriber station, a wireless terminal, a desktop computer (similar to the desktop computer 106 of FIG. 1), a portable electronic device (similar to the mobile device 108, the PDA 110, the laptop computer 112, the tablet computer 114, or the HMD 116 of FIG. 1), and the like. In certain embodiments, one or more of the client devices 106-116 of FIG. 1 can include the same or similar configuration as the electronic device 300. In certain embodiments, the electronic device 300 is an encoder, a decoder, or both. For example, the electronic device 300 is usable with data transfer, image or video compression, image or video decompression, encoding, decoding, and media rendering applications.

As shown in FIG. 3, the electronic device 300 includes an antenna 305, a radio-frequency (RF) transceiver 310, transmit (TX) processing circuitry 315, a microphone 320, and receive (RX) processing circuitry 325. The RF transceiver 310 can include, for example, a RF transceiver, a BLUETOOTH transceiver, a WI-FI transceiver, a ZIGBEE transceiver, an infrared transceiver, and various other wireless communication signals. The electronic device 300 also includes a speaker 330, a processor 340, an input/output (I/O) interface (IF) 345, an input 350, a display 355, a memory 360, and a sensor(s) 365. The memory 360 includes an operating system (OS) 361, and one or more applications 362.

The RF transceiver 310 receives, from the antenna 305, an incoming RF signal transmitted from an access point (such as a base station, WI-FI router, or BLUETOOTH device) or other device of the network 102 (such as a WI-FI, BLUETOOTH, cellular, 5G, LTE, LTE-A, WiMAX, or any other type of wireless network). The RF transceiver 310 down-converts the incoming RF signal to generate an intermediate frequency or baseband signal. The intermediate frequency or baseband signal is sent to the RX processing circuitry 325 that generates a processed baseband signal by filtering, decoding, and/or digitizing the baseband or intermediate frequency signal. The RX processing circuitry 325 transmits the processed baseband signal to the speaker 330 (such as for voice data) or to the processor 340 for further processing (such as for web browsing data).

The TX processing circuitry 315 receives analog or digital voice data from the microphone 320 or other outgoing baseband data from the processor 340. The outgoing baseband data can include web data, e-mail, or interactive video game data. The TX processing circuitry 315 encodes, multiplexes, and/or digitizes the outgoing baseband data to generate a processed baseband or intermediate frequency signal. The RF transceiver 310 receives the outgoing processed baseband or intermediate frequency signal from the TX processing circuitry 315 and up-converts the baseband or intermediate frequency signal to an RF signal that is transmitted via the antenna 305.

The processor 340 can include one or more processors or other processing devices. The processor 340 can execute instructions that are stored in the memory 360, such as the OS 361 in order to control the overall operation of the electronic device 300. For example, the processor 340 could control the reception of forward channel signals and the transmission of reverse channel signals by the RF transceiver 310, the RX processing circuitry 325, and the TX processing circuitry 315 in accordance with well-known principles. The processor 340 can include any suitable number(s) and type(s) of processors or other devices in any suitable arrangement. For example, in certain embodiments, the processor 340 includes at least one microprocessor or microcontroller. Example types of processor 340 include microprocessors, microcontrollers, digital signal processors, field programmable gate arrays, application specific integrated circuits, and discrete circuitry.

The processor 340 is also capable of executing other processes and programs resident in the memory 360, such as operations that receive and store data. The processor 340 can move data into or out of the memory 360 as required by an executing process. In certain embodiments, the processor 340 is configured to execute the one or more applications 362 based on the OS 361 or in response to signals received from external source(s) or an operator. Example, applications 362 can include an encoder, a decoder, a VR or AR application, a camera application (for still images and videos), a video phone call application, an email client, a social media client, a SMS messaging client, a virtual assistant, and the like. In certain embodiments, the processor 340 is configured to receive and transmit media content.

The processor 340 is also coupled to the I/O interface 345 that provides the electronic device 300 with the ability to connect to other devices, such as client devices 106-114. The I/O interface 345 is the communication path between these accessories and the processor 340.

The processor 340 is also coupled to the input 350 and the display 355. The operator of the electronic device 300 can use the input 350 to enter data or inputs into the electronic device 300. The input 350 can be a keyboard, touchscreen, mouse, track ball, voice input, or other device capable of acting as a user interface to allow a user in interact with the electronic device 300. For example, the input 350 can include voice recognition processing, thereby allowing a user to input a voice command. In another example, the input 350 can include a touch panel, a (digital) pen sensor, a key, or an ultrasonic input device. The touch panel can recognize, for example, a touch input in at least one scheme, such as a capacitive scheme, a pressure sensitive scheme, an infrared scheme, or an ultrasonic scheme. The input 350 can be associated with the sensor(s) 365 and/or a camera by providing additional input to the processor 340. In certain embodiments, the sensor 365 includes one or more inertial measurement units (IMUs) (such as accelerometers, gyroscope, and magnetometer), motion sensors, optical sensors, cameras, pressure sensors, heart rate sensors, altimeter, and the like. The input 350 can also include a control circuit. In the capacitive scheme, the input 350 can recognize touch or proximity.

The display 355 can be a liquid crystal display (LCD), light-emitting diode (LED) display, organic LED (OLED), active matrix OLED (AMOLED), or other display capable of rendering text and/or graphics, such as from websites, videos, games, images, and the like. The display 355 can be sized to fit within a HMD. The display 355 can be a singular display screen or multiple display screens capable of creating a stereoscopic display. In certain embodiments, the display 355 is a heads-up display (HUD). The display 355 can display 3D objects, such as a 3D point cloud or mesh.

The memory 360 is coupled to the processor 340. Part of the memory 360 could include a RAM, and another part of the memory 360 could include a Flash memory or other ROM. The memory 360 can include persistent storage (not shown) that represents any structure(s) capable of storing and facilitating retrieval of information (such as data, program code, and/or other suitable information). The memory 360 can contain one or more components or devices supporting longer-term storage of data, such as a read only memory, hard drive, Flash memory, or optical disc. The memory 360 also can contain media content. The media content can include various types of media such as images, videos, three-dimensional content, VR content, AR content, 3D point clouds, meshes, and the like.

The electronic device 300 further includes one or more sensors 365 that can meter a physical quantity or detect an activation state of the electronic device 300 and convert metered or detected information into an electrical signal. For example, the sensor 365 can include one or more buttons for touch input, a camera, a gesture sensor, an IMU sensors (such as a gyroscope or gyro sensor and an accelerometer), an eye tracking sensor, an air pressure sensor, a magnetic sensor or magnetometer, a grip sensor, a proximity sensor, a color sensor, a bio-physical sensor, a temperature/humidity sensor, an illumination sensor, an Ultraviolet (UV) sensor, an Electromyography (EMG) sensor, an Electroencephalogram (EEG) sensor, an Electrocardiogram (ECG) sensor, an IR sensor, an ultrasound sensor, an iris sensor, a fingerprint sensor, a color sensor (such as a Red Green Blue (RGB) sensor), and the like. The sensor 365 can further include control circuits for controlling any of the sensors included therein.

As discussed in greater detail below, one or more of these sensor(s) 365 may be used to control a user interface (UI), detect UI inputs, determine the orientation and facing the direction of the user for three-dimensional content display identification, and the like. Any of these sensor(s) 365 may be located within the electronic device 300, within a secondary device operably connected to the electronic device 300, within a headset configured to hold the electronic device 300, or in a singular device where the electronic device 300 includes a headset.

The electronic device 300 can create media content such as generate a virtual object or capture (or record) content through a camera. The electronic device 300 can encode the media content to generate a bitstream, such that the bitstream can be transmitted directly to another electronic device or indirectly such as through the network 102 of FIG. 1. The electronic device 300 can receive a bitstream directly from another electronic device or indirectly such as through the network 102 of FIG. 1.

Although FIGS. 2 and 3 illustrate examples of electronic devices, various changes can be made to FIGS. 2 and 3. For example, various components in FIGS. 2 and 3 could be combined, further subdivided, or omitted and additional components could be added according to particular needs. As a particular example, the processor 340 could be divided into multiple processors, such as one or more central processing units (CPUs) and one or more graphics processing units (GPUs). In addition, as with computing and communication, electronic devices and servers can come in a wide variety of configurations, and FIGS. 2 and 3 do not limit this disclosure to any particular electronic device or server.

Figure 4:
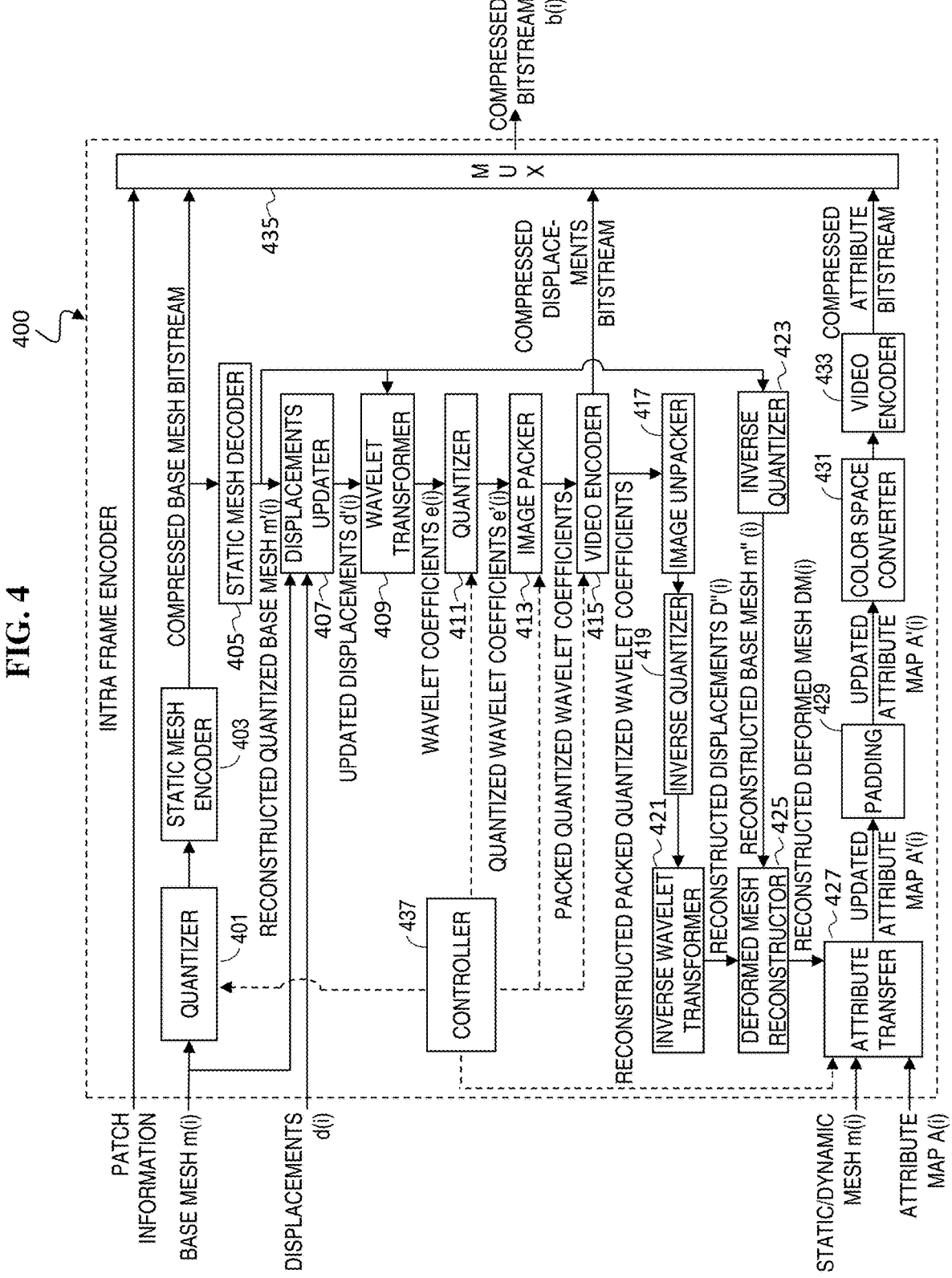
FIG. 4 illustrates a block diagram for an encoder encoding intra frames in accordance with an embodiment.

FIG. 4 illustrates a block diagram for an encoder encoding intra frames in accordance with an embodiment.

As shown in FIG. 4, the encoder 400 encoding intra frames in accordance with an embodiment may comprise a quantizer 401, a static mesh encoder 403, a static mesh decoder 405, a displacements updater 407, a wavelet transformer 409, a quantizer 411, an image packer 413, a video encoder 415, an image unpacker 417, an inverse quantizer 419, an inverse wavelet transformer 421, an inverse quantizer 423, a deformed mesh reconstructor 425, an attribute transfer module 427, a padding module 429, a color space converter 431, a video encoder 433, a multiplexer 435, and a controller 437.

The quantizer 401 may quantize a base mesh m(i) to generate a quantized base mesh. In some embodiments, the base mesh may have fewer vertices compared to an original mesh.

The static mesh encoder 403 may encode and compress the quantized base mesh to generate a compressed base mesh bitstream. In some embodiments, the base mesh may be compressed in a lossy or lossless manner. In some embodiments, an already existing mesh codec such as Draco may be used to compress the base mesh.

The static mesh decoder 405 may decode the compressed base mesh bitstream to generate a reconstructed quantized base mesh m'(i).

The displacements updater 407 may update displacements d(i) based on the base mesh m(i) after subdivision and the reconstructed quantized base mesh m'(i) to generate updated displacements d'(i). The reconstructed base mesh may undergo subdivision and then a displacement field between the original mesh and the subdivided reconstructed base mesh may be calculated. In inter coding of mesh frame, the base mesh may be coded by sending vertex motions instead of compressing the base mesh directly. In either case, a displacement field may be created. The displacement field as well as the modified attribute map may be coded using a video codec and also included as a part of the V-DMC bitstream.

The wavelet transformer 409 may perform a wavelet transform with the updated displacements d'(i) to generate displacement wavelet coefficients e(i). The wavelet transform may comprise a series of prediction and update lifting steps.

The quantizer 411 may quantize the displacement wavelet coefficients e(i) to generate quantized displacement wavelet coefficients e'(i). The quantized displacement wavelet coefficients may be denoted by an array dispQuantCoeffArray.

The image packer 413 may pack the quantized displacement wavelet coefficients e'(i) into a 2D image including packed quantized displacement wavelet coefficients dispQuantCoeffFrame. The 2D video frame may be referred to as a displacement frame or a displacement video frame in this disclosure.

The video encoder 415 may encode the packed quantized displacement wavelet coefficients dispQuantCoeffFrame to generate a compressed displacements bitstream.

The image unpacker 417 may unpack the packed quantized displacement wavelet coefficients dispQuantCoeffFrame to generate an array dispQuantCoeffArray of quantized displacement wavelet coefficients.

The inverse quantizer 419 may inversely quantize the array dispQuantCoeffArray of quantized displacement wavelet coefficients to generate displacement wavelet coefficients.

The inverse wavelet transformer 421 may perform an inverse wavelet transform with the displacement wavelet coefficients to generate reconstructed displacements d"(i).

The inverse quantizer 423 may inversely quantize the reconstructed quantized base mesh m'(i) to generate a reconstructed base mesh m"(i).

The deformed mesh reconstructor 425 may generate a reconstruct deformed mesh DM(i) based on the reconstructed displacements D"(i) and a reconstructed base mesh m"(i).

The attribute transfer module 427 may update an attribute map A(i) based on a static/dynamic mesh m(i) and a reconstructed deformed mesh DM(i) to generate an updated attribute map A'(i). The attribute map may be a texture map but other attributes may be sent as well.

The padding module 429 may perform padding to fill empty areas in the updated attribute map A'(i) so as to remove high frequency components.

The color space converter 431 may perform a color space conversion of the padded updated attribute map A'(i).

The video encoder 433 may encode the output of the color space converter 431 to generate the compressed attribute bitstream.

The multiplexer 435 may multiplex the compressed base mesh bitstream, the compressed displacements bitstream, and the compressed attribute bitstream to generate a compressed bitstream b(i).

The controller 437 may control modules of the encoder 400.

Figure 5:
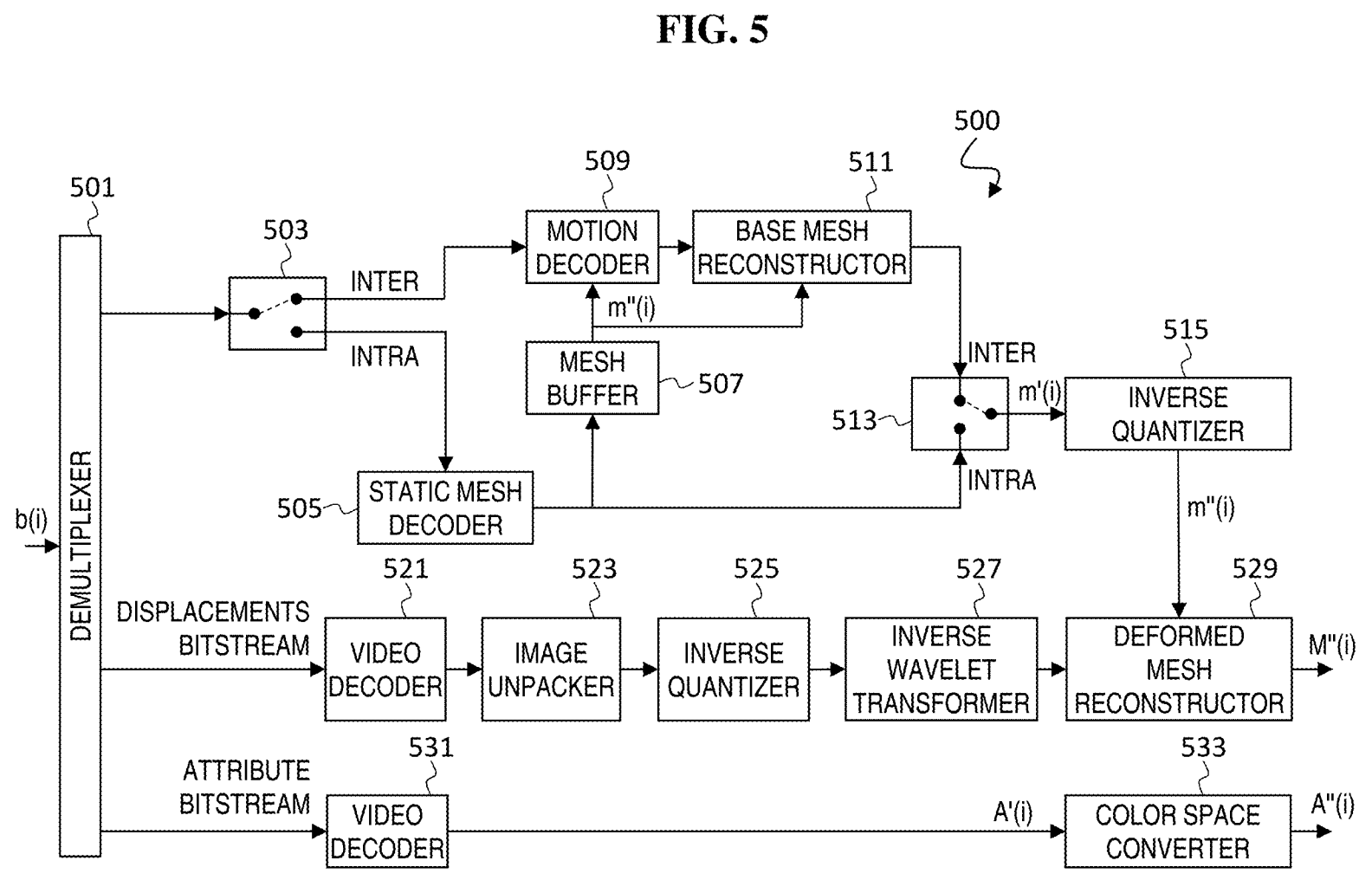

FIG. 5 illustrates a block diagram for a decoder in accordance with an embodiment.

As shown in FIG. 5, the decoder 500 may comprise a demultiplexer 501, a switch 503, a static mesh decoder 505, a mesh buffer 507, a motion decoder 509, a base mesh reconstructor 511, a switch 513, an inverse quantizer 515, a video decoder 521, an image unpacker 523, an inverse quantizer 525, an inverse wavelet transformer 527, a deformed mesh reconstructor 529, a video decoder 531, and a color space converter 533.

The demultiplexer 501 may receive the compressed bitstream b(i) from the encoder 400 to extract the compressed base mesh bitstream, the compressed displacements bitstream, and the compressed attribute bitstream from the compressed bitstream b(i).

The switch 503 may determine whether the compressed base mesh bitstream has an inter-coded mesh frame data or an intra-coded mesh frame data. If the compressed base mesh bitstream has the inter-coded mesh frame data, the switch 503 may transfer the inter-coded mesh frame data to the motion decoder 509. If the compressed base mesh bitstream has the intra-coded mesh frame data, the switch 503 may transfer the intra-coded mesh frame data to the static mesh decoder 507.

The static mesh decoder 505 may decode the intra-coded mesh frame data to generate a reconstructed quantized base mesh frame.

The mesh buffer 507 may store the reconstructed quantized base mesh frames and the inter-coded mesh frame data for future use of decoding subsequent inter-coded mesh frames. The reconstructed quantized base mesh frames may be used as reference mesh frames.

The motion decoder 509 may obtain motion vectors for a current inter-coded mesh frame based on data stored in the mesh buffer 507 and syntax elements in the bitstream for the current inter-coded mesh frame. In some embodiments, the syntax elements in the bitstream for the current inter-coded mesh frame may be a motion vector difference.

The base mesh reconstructor 511 may generate a reconstructed quantized base mesh frame by using syntax elements in the bitstream for the current inter-coded mesh frame based on the motion vectors for the current inter-coded mesh frame.

The switch 513 may transmit the reconstructed quantized base mesh frame from the static mesh decoder 505 to the inverse quantizer 515, if the compressed base mesh bitstream has the intra-coded mesh frame data. The switch 513 may transmit the reconstructed quantized base mesh frame from the static mesh decoder 511 to the inverse quantizer 515, if the the compressed base mesh bitstream has the inter-coded mesh frame data.

The inverse quantizer 515 may perform an inverse quantization with the reconstructed quantized base mesh frame to generate a reconstructed base mesh frame m"(i).

The video decoder 521 may decode a displacements bitstream to generate packed quantized displacement wavelet coefficients dispQuantCoeffFrame.

The image unpacker 523 may unpack the packed quantized displacement wavelet coefficients dispQuantCoeffFrame to generate an array dispQuantCoeffArray of quantized displacement wavelet coefficients.

The inverse quantizer 525 may perform the inverse quantization with the array dispQuantCoeffArray of quantized displacement wavelet coefficients to generate displacement wavelet coefficients.

The inverse wavelet transformer 527 may perform the inverse wavelet transform with displacement wavelet coefficients to generate displacements.

The deformed mesh reconstructor 529 may reconstruct a deformed mesh based on the displacements and the reconstructed base mesh frame m"(i).

The video decoder 531 may decode the attribute bitstream to generate an attribute map before a color space conversion.

The color space converter 533 may perform a color space conversion of the attribute map from the video decoder 531 to reconstruct the attribute map.

Hereinafter, the encoder 400 will be described in detail.

As described above, a base mesh, which typically has less number of vertices compared to the original mesh, may be created and compressed either in a lossy or lossless manner. The reconstructed base mesh may undergo subdivision and then a displacement field between the original mesh and the subdivided reconstructed base mesh may be calculated. In inter coding of mesh frame, the base mesh may be coded by sending vertex motions instead of compressing the base mesh directly. In either case, a displacement field may be created. In some cases, each displacement sample may have 3 components which are denoted by x, y, and z, respectively. These may be with respect to a canonical coordinate system or a local coordinate system where the x, y, and z represent the displacement in local normal, tangent, and bi-tangent directions.

The displacements updater 407 of the decoder 400 may update a displacement field d(i) to generate an updated displacement field d'(i). The displacement field d(i) may be expressed in the following equation 1.

$$d(i) = \lceil d_x(i), d_y(i), d_z(i) \rceil, 0 \le i < N \qquad \text{Equation 1}$$

where N represents the number of 3-D displacement vectors in a displacement field of a mesh-frame.

The wavelet transformer 409 may perform one or more levels of wavelet transform with the updated displacements d'(i) to create level of detail (LOD) signals $d^k(i)$, $i=0 \le i < N^k$, $0 \le k < numLOD$, where k denotes the index of the level of detail, $N^k$ denotes the number of samples in the level of detail signal at level k, and numLOD denotes the number of LODs. The quantizer 411 may scalar-quantize the LOD signals $d^k(i)$.

The image packer 413 may pack the quantized LOD signals into a 2D video frame, and the video encoder 415 may compress the 2D video frame by using a traditional video codec. The number of displacement component samples in a mesh frame may be different from that in another mesh frame. However, the video codec used in the video encoder 415 may expect displacement frames to have the same dimension. The image packer 413 may add padding in displacement frames if necessary so that displacement frames have the uniform dimension temporally.

The image packer 413 may reversibly pack the quantized displacement component samples. For example, the number of LODs numLOD may be equal to, but not limited to, 3 and the LODs may be denoted by lod0, lod1, and lod2, where lod0 contains the lowest frequency displacement wavelet coefficients and lod2 contains the highest frequency displacement wavelet coefficients. In a case that reversible packing is enabled, when the image packer 413 creates the displacement video frame, the image packer 413 may line up the LODs in one dimensional array from the lowest frequency or index of LOD data to the highest frequency or index of LOD data. For example, the one dimensional array may include lod0, lod1 following lod0, and lod2 following lod1 in the order of frequency or index. Then the image packer 413 may divide the one dimensional array of quantized displacement wavelet coefficients into blocks (typically 16×16) using scan order for displacement wavelet coefficients and then place the blocks into the displacement frame in scan order for packing blocks. The scan order for displacement wavelet coefficients may be, but not limited to, reverse Morton scan. The scan order for packing blocks may be, but not limited to, reverse raster scan when reversible packing is enabled. The scan order for packing blocks may be, but not limited to, forward raster scan when forward packing is enabled. These blocks may be referred to as V-Mesh packing blocks and their sizes may be denoted by blockSize.

The width of a displacement frame may be fixed to some multiple of the blockSize. The height of a displacement frame may vary depending on the number of points in the subdivided mesh. Hence, the image packer 413 may find the maximum of height over all the V-Mesh frames in a Group of Frames or the entire sequence. Then, the image packer 413 may set the height of the displacement video frame to the maximum height and add rows of padding samples to the displacement video frames to make the height of each displacement video frame equal to the maximum height.

In some embodiments, the padding samples may be set equal to default values. In some embodiments, the default value may be zero. In some embodiments, the default value may be the midpoint of values which the component bit-depth of displacement component samples is able to represent. In some embodiments, the default value for the luminance component of the displacement video may be 0 whereas the default value for the chrominance components may be the midpoint of the values represented by the component bit-depth. In some embodiments, the padding samples may be set equal to any values. In some embodiments, the value of one padding sample may be equal to or different from the value of another padding sample. For example, the padding samples may be set equal to any values between 0 and 255, if the bit depth of the padding samples is 8.

Hereinafter, placement of displacement component samples and padding in the displacement video frame in accordance with various embodiments will be described with reference to FIG. 6 to FIG. 15.

Figure 6:
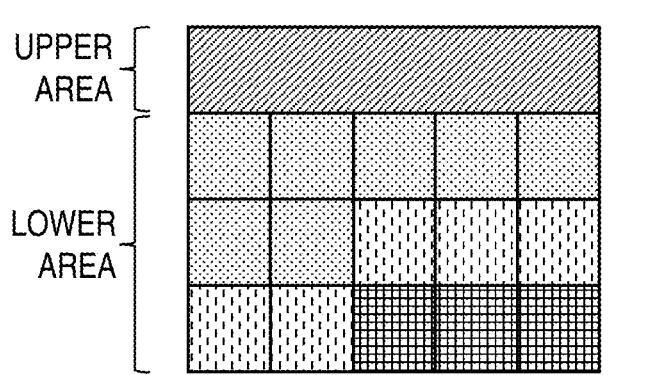
FIG. 6 shows a placement of displacement component samples and padding in a displacement video frame when reversible packing is enabled in accordance with an embodiment.
Figure 6:
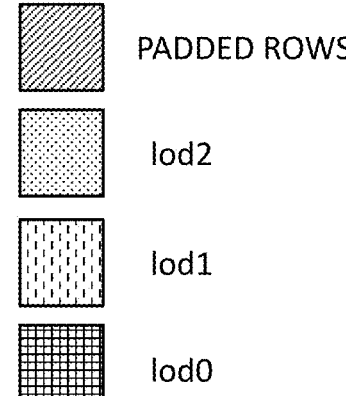

FIG. 6 shows a placement of displacement component samples and padding in a displacement video frame when reversible packing is enabled in accordance with an embodiment.

Referring to FIG. 6, since reversible packing is enabled, the displacement component samples may be packed in the displacement video frame in descending order. Padding and packing blocks may be placed in the displacement video frame in reverse raster scan order so that the packing blocks precede the padding in reverse raster scan order and a frequency or an LOD index of a subsequent block is not lower than a frequency or an LOD index of any block preceding the subsequent block in reverse raster scan order in the displacement video frame.

In some embodiments, the displacement video frame includes an upper area and a lower area. The upper area may not include any displacement wavelet coefficients but include padding. The padding may include rows of padding samples. The number of rows of padding samples may be an integer multiple of the blockSize, where the integer may be equal to or greater than 1. The lower area may include packing blocks containing displacement wavelet coefficients. The lower area may or may not include padding samples. One or more packing blocks in the lower area may or may not include padding samples. Since reversible packing is enabled, packing blocks may be packed in the lower area in descending order of frequency or LOD index. For example, the packing blocks may be placed in the lower area in reverse raster scan order so that a frequency or an LOD index of a subsequent block is not lower than a frequency or an LOD index of any block preceding the subsequent block in reverse raster scan order in the lower area.

Adding the padding at the top of the displacement video frame has certain drawbacks. For example, if the decoder 500 wants to decode only a particular LOD (e.g. lod2), it may have to decode all the padded rows at the top. This may waste computational resources and hence power. It can also slow down the adaptation of the arithmetic coding models used by the video codec of the video encoder 415.

To alleviate these drawbacks, in some embodiments, the padded rows may be placed at the bottom of the displacement video frame even when reversible packing is being used. The padded rows placed at the bottom of the displacement video frame will be described with reference to FIG. 7.

Figure 7:
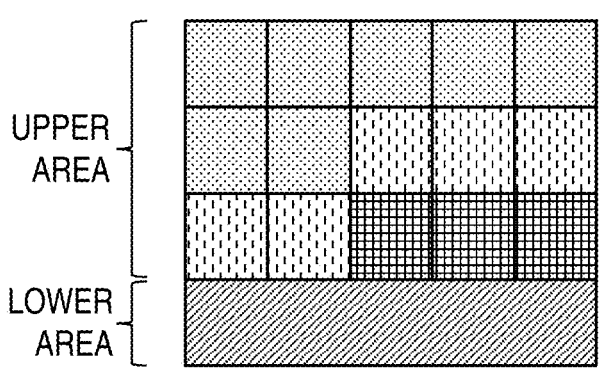
FIG. 7 shows a placement of displacement component samples and padding in a displacement video frame when reversible packing is enabled in accordance with an embodiment.
Figure 7:
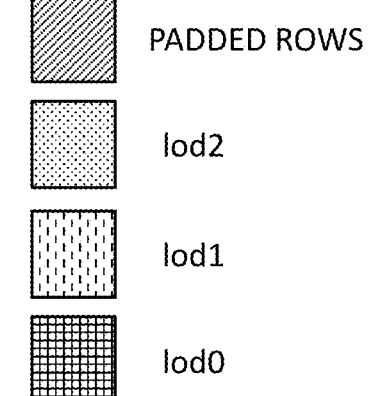

FIG. 7 shows a placement of displacement component samples and padding in a displacement video frame when reversible packing is enabled in accordance with an embodiment.

Referring to FIG. 7, since reversible packing is enabled, the displacement component samples may be packed in the displacement video frame in descending order. Packing blocks and padding may be placed in the displacement video frame in reverse raster scan order so that the padding precedes the packing blocks in reverse raster scan order and a frequency or an LOD index of a subsequent block is not lower than a frequency or an LOD index of any blocks preceding the subsequent block in reverse raster scan order in the displacement video frame.

In some embodiments, the displacement video frame includes an upper area and a lower area. The upper area may include packing blocks containing displacement wavelet coefficients belonging to LODs. The upper area may or may not include padding samples. One or more packing blocks in the upper area may or may not include padding samples. Since reversible packing is enabled, packing blocks may be packed in the upper area in descending order of frequency or LOD index. For example, the packing blocks may be placed in the upper area in reverse raster scan order so that a frequency or an LOD index of a subsequent block is not lower than a frequency or an LOD index of any block preceding the subsequent block in reverse raster scan order in the upper area. The lower area may not include any displacement wavelet coefficients but include padding. The padding may include rows of padding samples. The number of rows of padding samples may be an integer multiple of the blockSize.

In this scenario, the decoder 500 can just skip decoding of the padded rows since they come at the end of the frame and no valid data, which the decoder 500 needs, comes after them.

In some embodiments, if the decoder 500 wishes to decode only lod2, it may start at the top-left corner of the frame and have to only decode blocks corresponding to lod2 without having to decode any other blocks.

Figure 8:
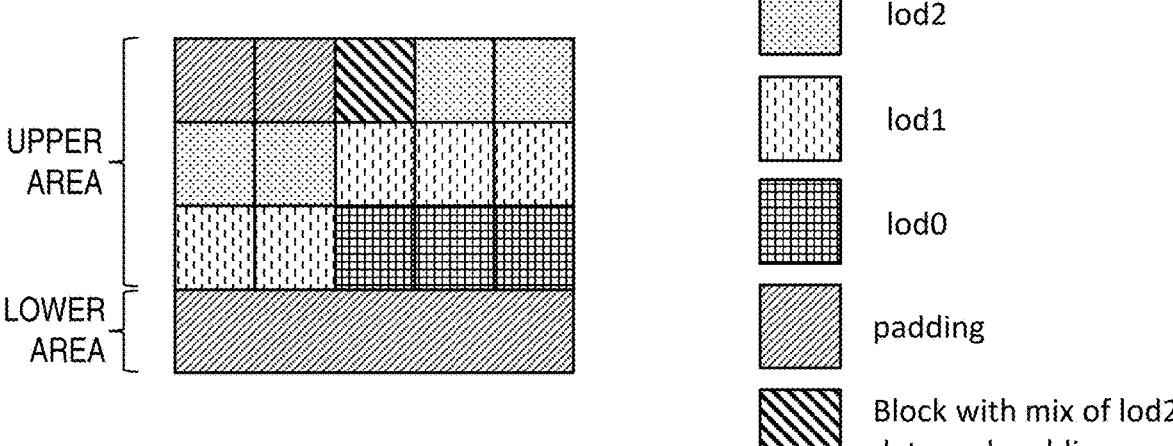
FIG. 8 shows a placement of displacement component samples and padding in a displacement video frame when reversible packing is enabled in accordance with an embodiment.

FIG. 8 shows a placement of displacement component samples and padding in a displacement video frame when reversible packing is enabled in accordance with an embodiment.

As mentioned previously, packing blocks belonging to lod2 may not completely fill the top row of blocks. In this case, some padding blocks in the beginning of the top row may be placed.

Referring to FIG. 8, the displacement video frame includes packing blocks. Hereinafter, a packing block having padding without any displacement wavelet coefficient may be referred to as a fully padded block or a padding block, a packing block having one or more displacement wavelet coefficients may be referred to as a displacement packing block, a displacement packing block containing one or more displacement wavelet coefficients and padding may be referred to as a partially padded block or a partially padded packing block, and a displacement packing block containing one or more displacement wavelet coefficients without padding may be referred to as a non-padded block or a non-padded packing block. The displacement video frame includes an upper area and a lower area. The upper area may include padding blocks and displacement packing blocks. The padding block may not include any displacement wavelet coefficients but include padding samples. The displacement packing blocks may include displacement wavelet coefficients belonging to an LOD. Since reversible packing is enabled, the displacement component samples or displacement packing blocks may be packed in the upper area in descending order of frequency or LOD index. For example, the padding blocks and the displacement packing blocks may be placed in the upper area in reverse raster scan order so that the displacement packing blocks precede the padding blocks in reverse raster scan order and a frequency or an LOD index of a subsequent displacement packing block is not lower than a frequency or an LOD index of any displacement packing block preceding the subsequent displacement packing block in reverse raster scan order in the upper area. The lower area may not include any displacement wavelet coefficients but include padding. The padding may include rows of padding samples. The number of rows of padding samples may be an integer multiple of the blockSize.

One or more displacement packing blocks in the upper area may or may not include padding samples. A partially padded block having both displacement wavelet coefficients belonging to an LOD and padding may not be allowed to precede non-padded packing blocks having displacement wavelet coefficients belonging to an LOD without padding in reverse raster scan order in the upper area. For example, referring to FIG. 8, if four non-padded packing blocks having displacement wavelet coefficients belonging to an LOD lod2 without padding and a partially padded block having both displacement wavelet coefficients belonging to the LOD lod2 and padding are placed, the partially padded block is not allowed to precede the four non-padded packing blocks in reverse raster scan order in the upper area.

Referring to FIG. 8, the displacement component samples are packed in the displacement video frame in descending order of frequency. The image packer 413 may line up quantized displacement wavelet coefficients belonging to a plurality of LODs (lod0, lod1, and lod2 in FIG. 8) in one dimensional array in increasing order.

However, in this scenario, if the decoder 500 wishes to decode only lod2, it may end up decoding the blocks in the beginning which have padding samples.

Figure 9:
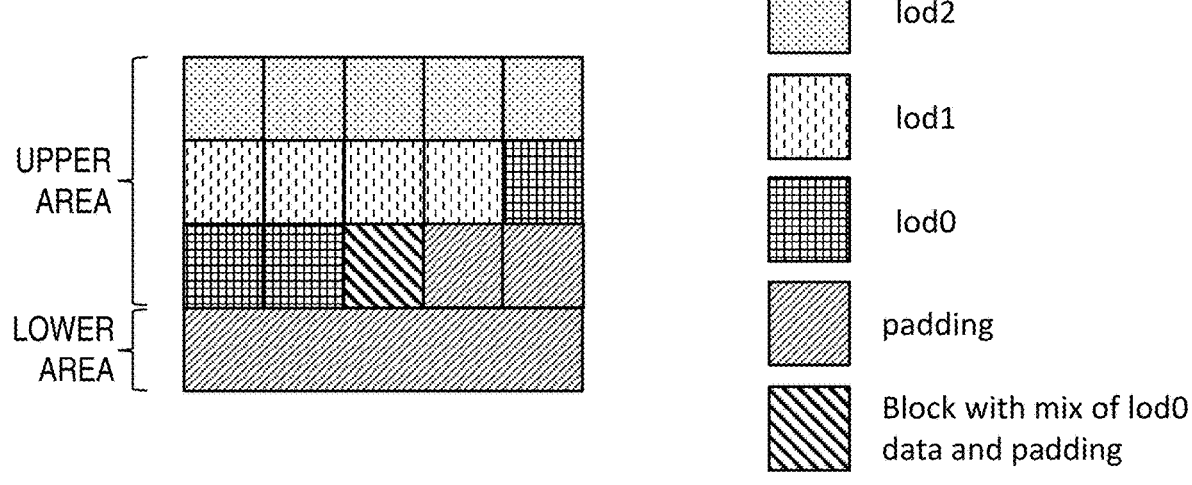
FIG. 9 shows a placement of displacement component samples and padding in a displacement video frame when reversible packing is enabled in accordance with an embodiment.

FIG. 9 shows a placement of displacement component samples and padding in a displacement video frame when reversible packing is enabled in accordance with an embodiment.

To alleviate problems described in relation to FIG. 8, in some embodiments, the start of the reversible packing may be modified as follows. Instead of starting the placement of the data from lod0 at the end of the last row of non-padded blocks in the upper area, the data is filled in from the middle of that row such that all the blocks in the topmost row of blocks are filled with actual data from LODs. For convenience, displacement wavelet coefficients belonging to a LOD may be referred to as data from the LOD. Referring to FIG. 9, the upper area may include padding blocks and displacement packing blocks. Since reversible packing is enabled, the displacement component samples or displacement packing blocks may be packed in the upper area in descending order of frequency or LOD index. For example, the padding blocks and the displacement packing blocks may be placed in the upper area in reverse raster scan order so that the padding blocks precede the displacement packing blocks in reverse raster scan order and a frequency or an LOD index of a subsequent displacement packing block is not lower than a frequency or an LOD index of any displacement packing block preceding the subsequent displacement packing block in reverse raster scan order in the upper area. The lower area may not include any displacement wavelet coefficients but include padding. The padding may include rows of padding samples.

One or more displacement packing blocks in the upper area may or may not include padding samples. The non-padded packing blocks having displacement wavelet coefficients belonging to an LOD without padding may not be allowed to precede a partially padded block having both displacement wavelet coefficients belonging to an LOD and padding in reverse raster scan order in the upper area.

Referring to FIG. 9, for the bottom non-padded row of blocks in the upper area, the last two blocks may correspond to a padding block having padding samples and not having any displacement wavelet coefficients. The third block from the right in the bottom non-padded row of blocks may correspond to partially padded block having padding samples and at least one displacement wavelet coefficients belonging to a LOD lod0. However, the leftmost block from the topmost row of blocks does not contain any padding sample for padding but contains the highest frequency displacement wavelet coefficients belonging to lod2. Both the encoder and decoder may calculate the start of the non-padded values in the reverse scan based on the number of samples in the LODs and the packing block size.

Figure 10:
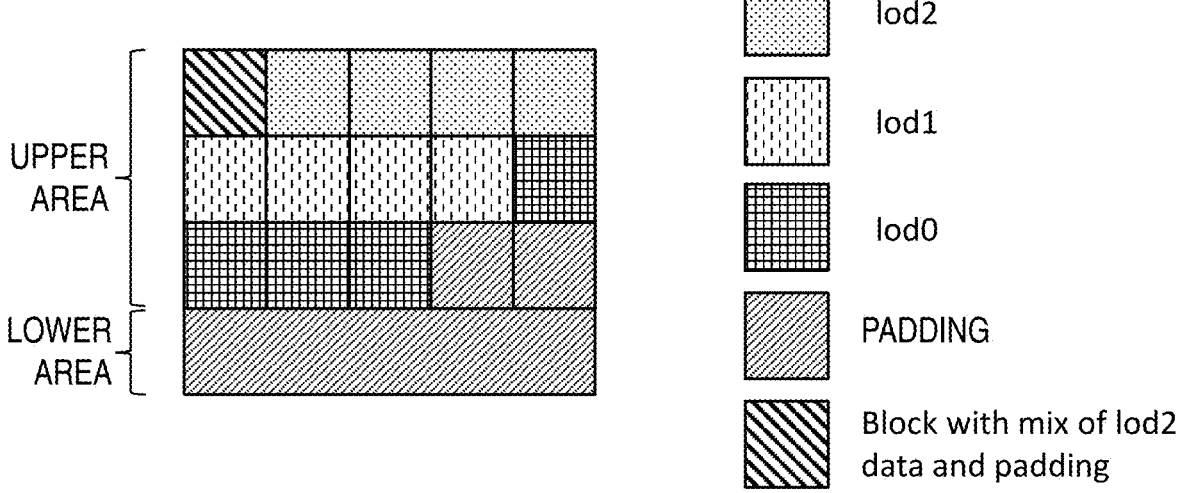
FIG. 10 shows a placement of displacement component samples and padding in a displacement video frame when reversible packing is enabled in accordance with an embodiment.

FIG. 10 shows a placement of displacement component samples and padding in a displacement video frame when reversible packing is enabled in accordance with an embodiment.

In some embodiments, in reverse packing, the lowest frequency displacement wavelet coefficients belonging to lod0 may always start at the beginning of a new block in reverse packing order.

Referring to FIG. 10, the upper area may include padding blocks and displacement packing blocks. Since reversible packing is enabled, the displacement component samples or displacement packing blocks may be packed in the upper area in descending order of frequency or LOD index. For example, the padding blocks and the displacement packing blocks may be placed in the upper area in reverse raster scan order so that the padding blocks precede the displacement packing blocks in reverse raster scan order and a frequency or an LOD index of a subsequent displacement packing block is not lower than a frequency or an LOD index of any displacement packing block preceding the subsequent displacement packing block in reverse raster scan order in the upper area. The lower area may not include any displacement wavelet coefficients but include padding. The padding may include rows of padding samples.

One or more displacement packing blocks in the upper area may or may not include padding samples. A partially padded block having both displacement wavelet coefficients belonging to an LOD and padding may not be allowed to precede packing blocks having displacement wavelet coefficients belonging to an LOD without padding in reverse raster scan order in the upper area. For example, referring to FIG. 8, if four non-padded packing blocks having displacement wavelet coefficients belonging to an LOD lod2 without padding and a partially padded block having both displacement wavelet coefficients belonging to the LOD lod2 and padding are placed, the partially padded block is not allowed to precede the four packing blocks in reverse raster scan order in the upper area.

Referring to FIG. 10, lod0 starts at the third block from the right in the bottom-most non-padded row of blocks. The top-left block corresponds to a partially padded block containing the highest frequency displacement wavelet coefficients belonging to lod2 and padding samples.

The strategies described above for the starting point for the placement of LOD data may be repeated for each subframe corresponding to a submesh when more than one submesh is used. Similarly, the above strategies may be repeated for each of X, Y, and Z components (or normal, tangent, bi-tangent components) irrespective of whether they are packed in a single luminance component of a 4:2:0 format displacement video.

The placement methods for LOD data described above may be applied when the padding is at the top of the displacement video frame or the packing order is forward. The placement methods for LOD data described above may be applied when the padding is at the top of the displacement video frame and the packing order is forward. Simple modifications may be necessary to account for the different scanning and placement of padded rows. In some embodiments, the padded data may be put in its own slice(s) and a slice header is inserted at the end of LOD data. This way the decoder 500 can completely decode slice(s) containing LOD data the decoder 500 wants to decode and skip decoding the last slice containing the padding.

In some embodiments, if the padded data is put at the beginning of the frame as shown in FIG. 6, then it may be put into a separate slice, so that it can be skipped while decoding.

Figure 11:
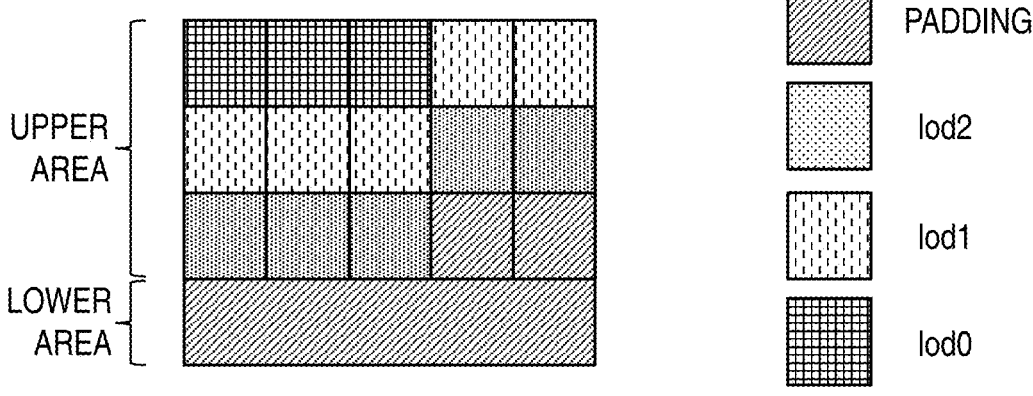
FIG. 11 shows a placement of displacement component samples and padding in a displacement video frame when reversible packing is not used in accordance with an embodiment.

FIG. 11 shows a placement of displacement component samples and padding in a displacement video frame when reversible packing is not used in accordance with an embodiment.

Referring to 11, the displacement video frame includes an upper area and a lower area. The upper area includes a plurality of rows of blocks and each row of the plurality of rows includes at least one block containing displacement wavelet coefficients belonging to a LOD. The upper area may or may not include padding samples. The displacement component samples are packed in the displacement video frame in ascending order of frequency. For example, the padding blocks and the displacement packing blocks may be placed in the upper area in raster scan order so that the displacement packing blocks precede the padding blocks in raster scan order and a frequency or an index of a subsequent block is not allowed to be lower than a frequency or an index of any block preceding the subsequent block in raster scan order in the upper area. The lower area does not include any displacement wavelet coefficients but includes padding. The padding includes rows of padding samples.

The decoder 500 may want to decode only certain LODs without decoding other LODs. In a more common scenario, when there are N LODs, indexed as 0, 1, 2, . . . , (N−1), the decoder 500 may wish to decode all the LODs from 0 to k, where k<(N−1) and discard the remaining LODs indexed as (k+1), . . . , (N−1) and padded rows. As an example, the decoder 500 may want to decode lod0 and lod1, but not want to decode lod2 and padded rows. However, when reverse scanning is enabled, blocks belonging to lod0 are placed at the end of the displacement video frame in scan order, which makes partial and/or independent decoding more challenging.

To enable partial and/or independent decoding of the displacement data, in some embodiments, the encoder may encode the displacement video frames using multiple slices. In some embodiments, any slice contains data corresponding to only a single LOD or padded data. In another embodiment, each slice may contain data belonging to multiple LODs and possibly padded rows. In some embodiments, referring to FIG. 7, one slice may contain lod1 and lod2 and another may contain lod0 and padded rows.

To ensure that it is possible to separate different LODs into slices, in some embodiments, any basic block in the basic block structure used by the video codec of the video encoder 415 may contain data from only one LOD or padded data. A unit block used to define or configure a slice for a video coding standard used by the video encoder 415 or the largest block used to configure a slice for a video coding standard used by the video encoder 415 may be referred to as the basic block or a codec basic block. For example, when the video encoder 415 uses HEVC, since a slice is defined as a plurality of coding tree units (CTUs), the size of the basic block may be set equal to the size of the coding tree unit (CTU) specified by the video encoder 415. When the video encoder 415 uses Advanced Video Coding (AVC), since a slice is defined as a plurality of macroblocks, the size of the basic block standard may be set equal to the size of the macroblock specified by the video encoder 415. In some embodiments, a new LOD may be aligned with a new CTU boundary. However, it is necessary to specify how the next CTU is determined. In some embodiments, a unit block which does not span multiple slices may be referred to as the basic block or a codec basic block.

Figure 12:
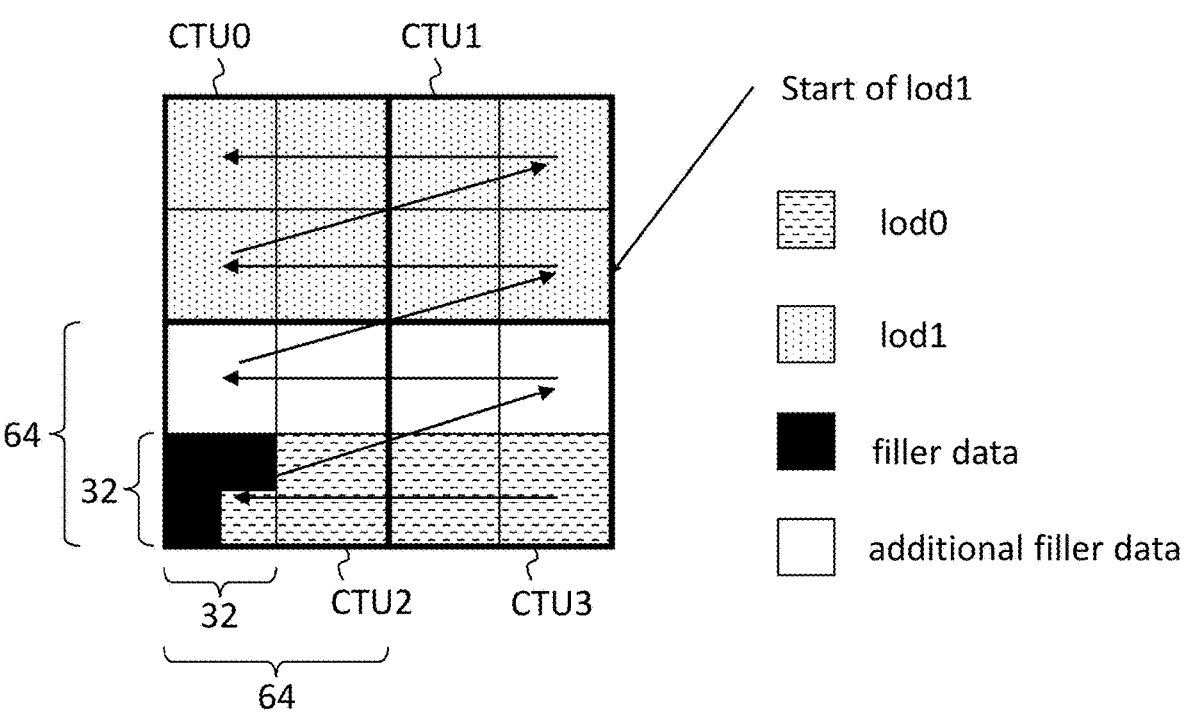
FIG. 12 shows a placement of displacement component samples and filler data in a displacement video frame when reversible packing is used in accordance with an embodiment.

FIG. 12 shows a placement of displacement component samples and filler data in a displacement video frame when reversible packing is used in accordance with an embodiment.

Referring to FIG. 12, the displacement video frame includes 4 coding tree units CTU0, CTU1, CTU2, and CTU3. Displacement component samples belonging to 2 LODs are placed in the displacement video frame, the V-Mesh packing block size is 32×32, the HEVC CTU block size is 64×64, and reverse packing is enabled. There are no padded rows. lod0 ends in the fourth V-Mesh packing block in reverse raster scan order. With the reverse raster scan, the next packing block would be the top-right block in the coding tree unit CTU3. However, to be able to separate the data from lod0 and lod1 into different slices, in some embodiments, the start of lod1 may be placed in the coding tree unit CTU1 as shown in the FIG. 12. In this embodiment, the row of V-Mesh packing blocks including top-right and top-left blocks of the coding tree unit CTU3 and top-right and top-left blocks of the coding tree unit CTU2 may contain filler data that may be discarded by the decoder 500. Thus, when an LOD ends, the data from the next LOD may be placed in the next CTU in scan order which does not contain data from any of the previous LODs or padded rows. Therefore, there may be a need to skip a number of v-mesh packing blocks to align with the next codec block, thereby increasing the overall size of the displacement video.

Since a displacement video codec like a wavelet-based codec may not have concept of a block size, it may be better to not define the alignment based on the concept of a codec block size. Instead, in some embodiments, a packing super block having dimensions which are integer multiples of blockSize may be used, where the integer may be equal to or greater than 1. In some embodiments, when an LOD ends, the data from the next LOD may be placed in the next packing super block in scan order which does not contain data from any of the previous LODs or padded rows regardless of whether the scan order is forward or reverse. In some embodiments, the encoder, when possible, may choose the packing super block size to match with the block size corresponding to the codec that is used by the video decoder 415. For example, if HEVC is being used, the encoder may match the packing super block size with the CTU size. In some embodiments, the packing super block size may be the same as the CTU size.

When the start of LOD is aligned with the start of a new packing super block and the new packing super block matches a block in the basic block structure used by the video codec of the video encoder 415, in some embodiments, data from each LOD may be placed in a separate slice, irrespective of whether reverse packing is being used and where the padded rows are placed. The padded rows may also be placed in a separate slice, irrespective of whether reverse packing is being used and where the padded rows are placed. In some embodiments, the number of padded rows may be increased to match with the height of the basic block. For example, the number of padded rows may be increased to match with the CTU height in HEVC. The v-mesh decoder 500 may only decode some slices to access some LODs and discard others.

In some embodiments, the v-mesh packing block size may be aligned with the packing super block size or equivalently the basic block size used by the displacement video codec of the video encoder 415. Then, alignment may be performed so that the data corresponding to a new LOD is placed in a new packing super block or equivalently, a new codec block in the scan order regardless of whether the scan order is forward or reverse. Different slices may be used for different LODs as described previously. This condition may be signaled using an SEI message or a flag in the v-mesh bitstream as a syntax element. In some embodiments, a flag or SEI message may indicate whether each LOD and padded rows are placed in different slices. For example, a flag set equal to 1 may indicate that displacement component samples belonging to any two different LODs are not allowed to be placed in the same slice and displacement component samples belonging to any different LOD and padded rows are not allowed to be placed in the same slice. The flag set equal to 0 may indicate that displacement component samples belonging to any two different LODs are allowed to be placed in the same slice and displacement component samples belonging to any different LOD and padded rows are allowed to be placed in the same slice. When the value of the flag is 1, in some embodiments, based on whether reverse scan is being used and whether the padded rows are at the bottom of the video frame, the decoder 500 can infer the correspondence between slices and LODs and between slices and padded row data. In some embodiments, the v-mesh packing block size may be an integer multiple of the codec basic block size, where the integer may be equal to or greater than 1. For example, the size of the v-mesh packing block may be equal to the size of the codec basic block, or 2, 3, or 4 times the size of the codec basic block. The width of the v-mesh packing block may be an integer multiple of the width of the codec basic block and the height of the v-mesh packing block may be an integer multiple of the height of the codec basic block.

Figure 13A:
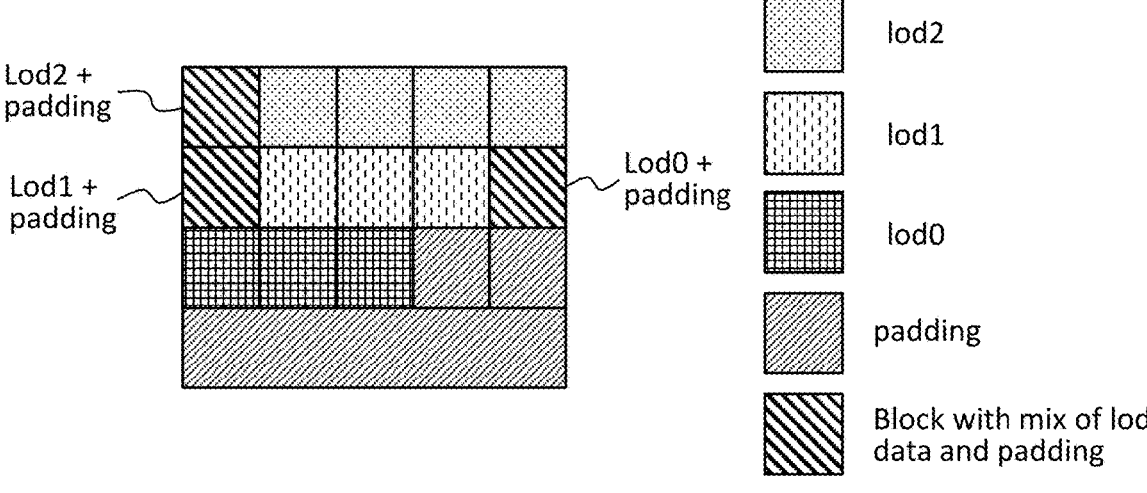
FIGS. 13A, 13B, and 13C show a placement of displacement component samples and padding in a displacement video frame when reversible packing is enabled in accordance with some embodiments.
Figure 13B:
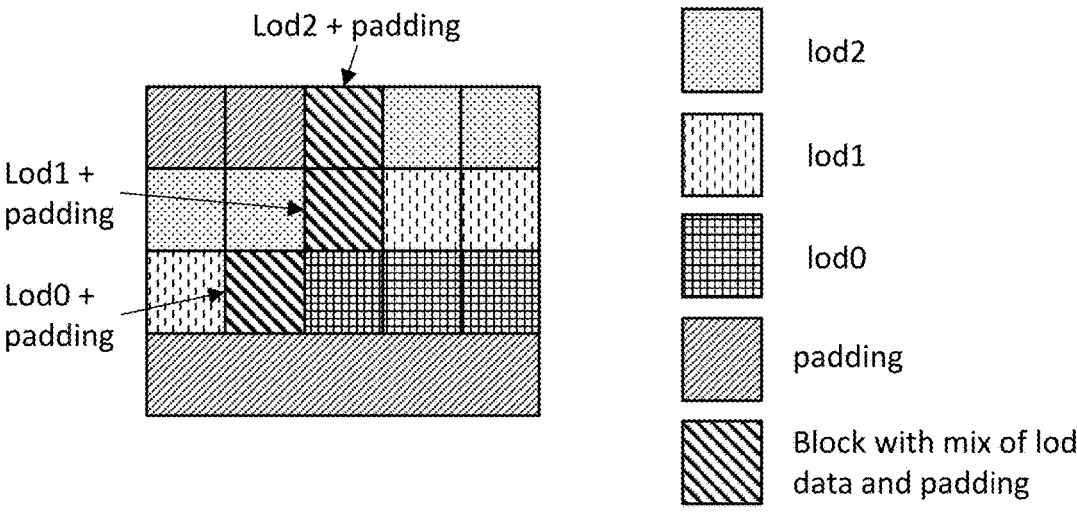
Figure 13C:
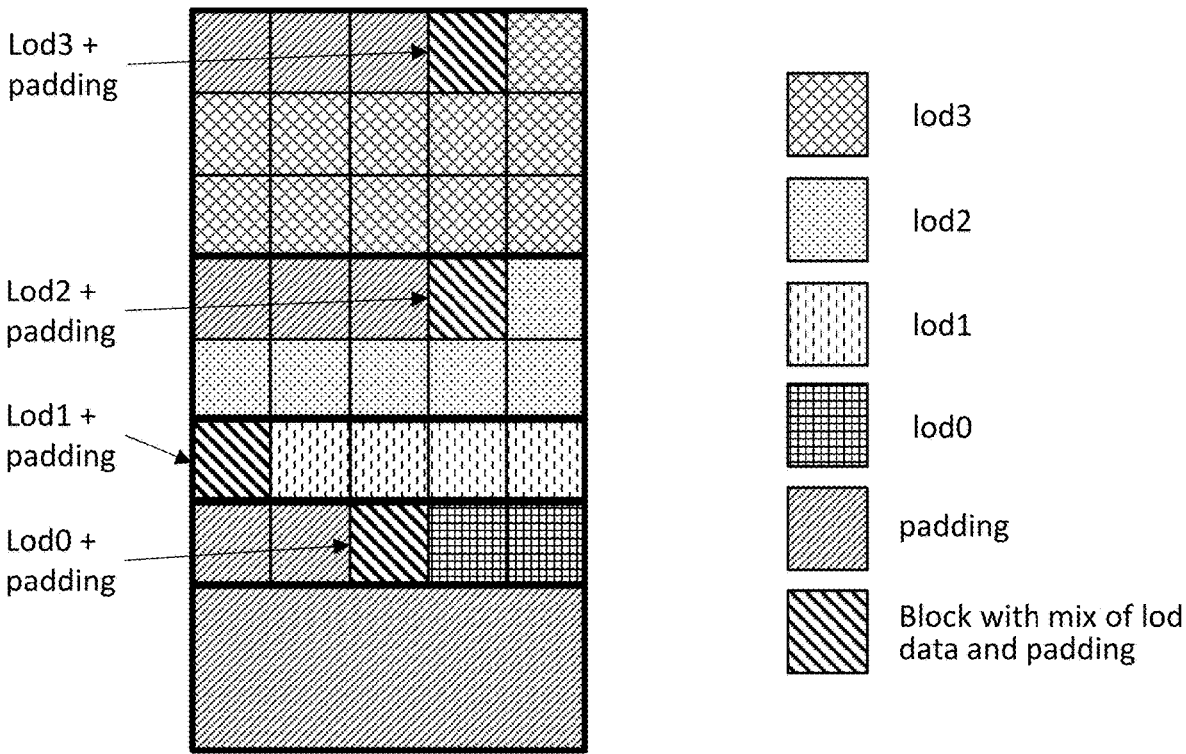

FIGS. 13A, 13B, and 13C show a placement of displacement component samples and padding in a displacement video frame when reversible packing is enabled in accordance with some embodiments.

In some embodiments, referring to FIG. 13A, the starting block for lod0 in the reverse packing case may be determined so that the top-left block contains one or more samples from the highest LOD. There may be zero or more blocks containing padding samples on the right side of the bottom-most row of blocks containing data from lod0.

Referring to FIG. 13A, the upper area may include padding blocks and displacement packing blocks. Since reversible packing is enabled, the displacement component samples or displacement packing blocks may be packed in the upper area in descending order of frequency or LOD index. For example, the padding blocks and the displacement packing blocks may be placed in the upper area in reverse raster scan order so that the padding blocks precede the displacement packing blocks in reverse raster scan order and a frequency or an LOD index of a subsequent displacement packing block is not lower than a frequency or an LOD index of any displacement packing block preceding the subsequent displacement packing block in reverse raster scan order in the upper area. The lower area may not include any displacement wavelet coefficients but include padding. The padding may include rows of padding samples.

One or more displacement packing blocks in the upper area may or may not include padding samples. A partially padded block having both displacement wavelet coefficients belonging to an LOD and padding may not be allowed to precede non-padded packing blocks having displacement wavelet coefficients belonging to an LOD without padding in reverse raster scan order in the upper area.

Referring to FIG. 13A, two padding blocks are followed by three non-padded packing blocks belonging to lod0 in reverse raster scan order. The three non-padded packing blocks belonging to lod0 are followed by one partially padded packing block belonging to lod0 in reverse raster scan order. The one partially padded packing block belonging to lod0 is followed by three non-padded packing blocks belonging to lod1 in reverse raster scan order. The three non-padded packing blocks belonging to lod1 are followed by one partially padded packing block belonging to lod1 in reverse raster scan order. The one partially padded packing block belonging to lod1 is followed by four non-padded packing blocks belonging to lod2 in reverse raster scan order. The four non-padded packing blocks belonging to lod2 are followed by one partially padded packing block belonging to lod2 in reverse raster scan order. Both the encoder and decoder may calculate the number of packing blocks (rounded to the next higher integer) that are needed for each LOD based on the number of samples in each LOD and determine the number of padded packing blocks that are needed in the beginning of the reverse scan through the packing blocks in the upper area.

In some embodiments, referring to FIG. 13B, the starting block for lod0 in the reverse packing case may start at the bottom-right of the upper area. There may be zero or more padding blocks on the left side of the top-most row of blocks in the upper area.

Referring to FIG. 13B, the upper area may include padding blocks and displacement packing blocks. Since reversible packing is enabled, the displacement component samples or displacement packing blocks may be packed in the upper area in descending order of frequency or LOD index. For example, the padding blocks and the displacement packing blocks may be placed in the upper area in reverse raster scan order so that the displacement packing blocks precede the padding blocks in reverse raster scan order and a frequency or an LOD index of a subsequent displacement packing block is not lower than a frequency or an LOD index of any displacement packing block preceding the subsequent displacement packing block in reverse raster scan order in the upper area. The lower area may not include any displacement wavelet coefficients but include padding. The padding may include rows of padding samples.

One or more displacement packing blocks in the upper area may or may not include padding samples. A partially padded block having both displacement wavelet coefficients belonging to an LOD and padding may not be allowed to precede non-padded packing blocks having displacement wavelet coefficients belonging to an LOD without padding in reverse raster scan order in the upper area.

Referring to FIG. 13B, three non-padded packing blocks belonging to lod0 are followed by one partially padded packing block belonging to lod0 in reverse raster scan order. The one partially padded packing block belonging to lod0 is followed by three non-padded packing blocks belonging to lod1 in reverse raster scan order. The three non-padded packing blocks belonging to lod1 are followed by one partially padded packing block belonging to lod1 in reverse raster scan order. The one partially padded packing block belonging to lod1 is followed by four non-padded packing blocks belonging to lod2 in reverse raster scan order. The four non-padded packing blocks belonging to lod2 are followed by one partially padded packing block belonging to lod2 in reverse raster scan order. The one partially padded packing block belonging to lod2 is followed by two padding blocks in reverse raster scan order. Both the encoder and decoder may calculate the number of packing blocks (rounded to the next higher integer) that are needed for each LOD based on the number of samples in each LOD and determine the number of padded packing blocks that are needed in the end of the reverse scan through the packing blocks in the upper area.

To enable partial decoding of displacement wavelet coefficients belonging to one or more LODs independently from displacement wavelet coefficients belonging to other LODs, it may be necessary that boundaries of slices are aligned with boundaries of codec basic blocks. For boundaries of slices to be aligned with boundaries of codec basic blocks, it may be necessary that the size of packing blocks may be an integer multiple of the size of the codec basic blocks, where the integer may be equal to or greater than 1. These restrictions may not be merely applicable for the displacement video frames which are divided into slices, but also applicable for the displacement video frames having a different frame structure. For example, the restrictions may be applicable for the displacement video frames which are divided into a plurality of rectangular regions. The plurality of rectangular regions may be partially or independently decodable. In some embodiments, when the video encoder 415 uses HEVC as a video codec, the rectangular region may be a tile. In some embodiments, when the video encoder 415 uses Versatile video coding (VVC) as a video codec, the rectangular region may be a tile or a subpicture. Hereinafter, the displacement video frames which are divided into tiles will be described with reference to FIG. 13C.

In some embodiments, referring to FIG. 13C, the starting block for lod0 in the reverse packing case may start at the bottom-right of the upper area. There may be zero or more padding blocks on the left side of the top-most row of blocks in the upper area.

Referring to FIG. 13C, the upper area may include padding blocks and displacement packing blocks. The displacement video frame is divided into a plurality of rectangular regions. A plurality of LODs may be associated with a respective one of the plurality of rectangular regions. A respective one rectangular region contains displacement wavelet coefficients belonging to a LOD associated with the respective one rectangular region and does not contain displacement wavelet coefficients belonging to a LOD which is not associated with the respective one rectangular region. Since reversible packing is enabled, the displacement component samples or displacement packing blocks may be packed in the upper area in descending order of frequency or LOD index. For example, the padding blocks and the displacement packing blocks may be placed in the upper area so that packing blocks containing displacement wavelet coefficients belonging to a LOD with a lower LOD index precede, in reverse raster scan order, packing blocks containing displacement wavelet coefficients belonging to a LOD with a higher LOD index. The rectangular regions may be placed in the upper area so that a rectangular region including packing blocks containing displacement wavelet coefficients belonging to a LOD with a lower LOD index precede, in reverse raster scan order, a rectangular region including packing blocks containing displacement wavelet coefficients belonging to a LOD with a higher LOD index. In each rectangular region of the rectangular regions, a partially padded block may not be allowed to precede the non-padded packing blocks in reverse raster scan order. In each rectangular region of the rectangular regions, a fully padded block may not be allowed to precede the partially padded block in reverse raster scan order. The lower area may not include any displacement wavelet coefficients but include padding. The padding may include rows of padding samples.

To enable partial decoding of displacement wavelet coefficients belonging to one or more LODs, in particular, but not limited to, independently from displacement wavelet coefficients belonging to other LODs, it may be necessary that boundaries of the rectangular regions are aligned with boundaries of codec basic blocks. For boundaries of the rectangular regions to be aligned with boundaries of codec basic blocks, it may be necessary that the size of packing blocks may be an integer multiple of the size of the codec basic blocks, where the integer may be equal to or greater than 1. A unit block used to define or configure a partially or independently decodable region for a video coding standard used by the video encoder 415 or the largest block used to configure a partially or independently decodable region for a video coding standard used by the video encoder 415 may be referred to as the basic block or a codec basic block. In some embodiments, when the video encoder 415 uses HEVC as a video codec, the partially or independently decodable region may be a tile or a slice and the unit block may be a coding tree unit (CTU). In some embodiments, when the video encoder 415 uses AVC as a video codec, the partially or independently decodable region may be a slice and the unit block may be a macroblock. In some embodiments, when the video encoder 415 uses VVC as a video codec, the partially or independently decodable region may be a subpicture, a tile or a slice and the unit block may be a coding tree unit (CTU).

Figure 14:
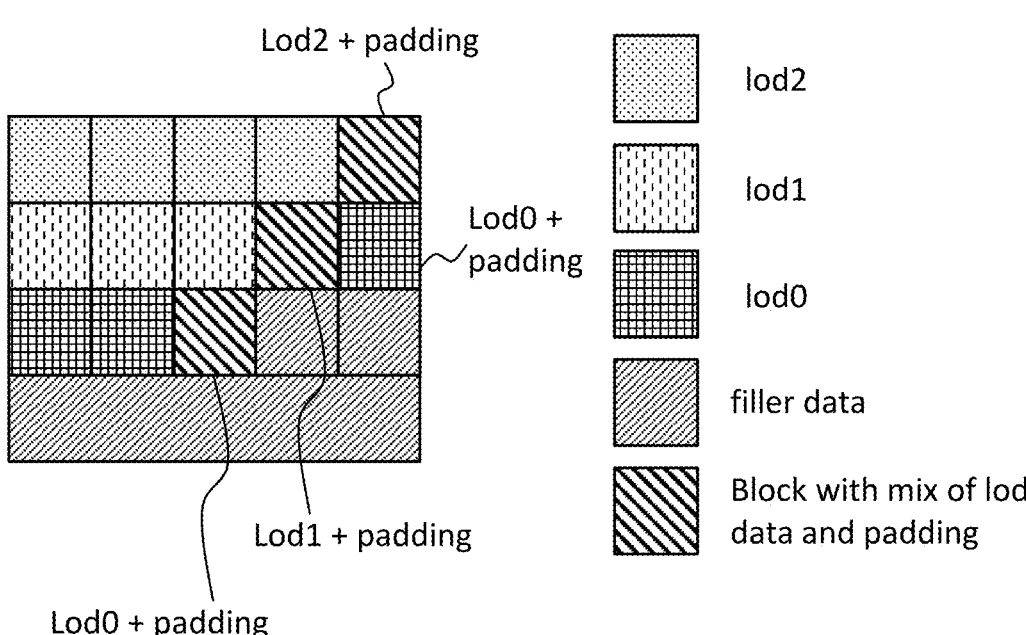
FIG. 14 shows a placement of displacement component samples and padding in a displacement video frame when reversible packing is enabled in accordance with an embodiment.

FIG. 14 shows a placement of displacement component samples and padding in a displacement video frame when reversible packing is enabled in accordance with an embodiment.

In some embodiments, referring to FIG. 14, the start of the data for each LOD in the reverse scan may be adjusted so that the each LOD ends at the block boundary.

Referring to FIG. 14, the upper area may include padding blocks and packing blocks. Since reversible packing is enabled, the displacement component samples or packing blocks may be packed in the upper area in descending order of frequency or LOD index. For example, the padding blocks and the packing blocks may be placed in the upper area in reverse raster scan order so that the padding blocks precede the packing blocks in reverse raster scan order and a frequency or an LOD index of a subsequent packing block is not lower than a frequency or an LOD index of any packing block preceding the subsequent packing block in reverse raster scan order in the upper area. The lower area may not include any displacement wavelet coefficients but include padding. The padding may include rows of padding samples.

One or more packing blocks in the upper area may or may not include padding samples. Non-padded packing blocks having displacement wavelet coefficients belonging to an LOD without padding may not be allowed to precede a partially padded block having both displacement wavelet coefficients belonging to an LOD and padding in reverse raster scan order in the upper area.

Referring to FIG. 14, two padding blocks are followed by one partially padded packing block belonging to lod0 in reverse raster scan order. The one partially padded packing block belonging to lod0 is followed by three non-padded packing blocks belonging to lod0 in reverse raster scan order. The three non-padded packing blocks belonging to lod0 are followed by one partially padded packing block belonging to lod1 in reverse raster scan order. The one partially padded packing block belonging to lod1 is followed by three non-padded packing blocks belonging to lod1 in reverse raster scan order. The three non-padded packing blocks belonging to lod1 are followed by one partially padded packing block belonging to lod2 in reverse raster scan order. The one partially padded packing block belonging to lod2 are followed by four non-padded packing blocks belonging to lod2 in reverse raster scan order. When a packing block is a partially padded block, the encoder and decoder may determine where the non-padded data starts in the reverse scan based on the number of samples in that LOD.

The placement methods for LOD data described above may be applied when the padding is at the top of the displacement video frame or the forward packing is used instead of reverse packing. The placement methods for LOD data described above may be applied when the padding is at the top of the displacement video frame and the packing order is forward. Simple modifications may be necessary to account for the different scanning and placement of padded rows.

Figure 15:
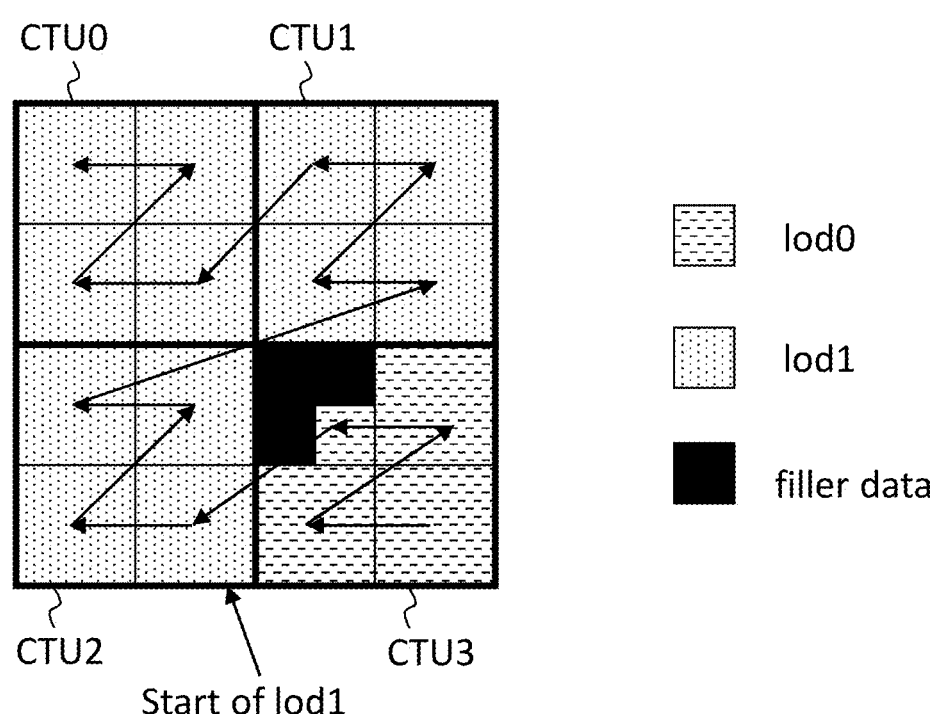
FIG. 15 shows a placement of displacement component samples in a displacement video frame when reversible packing is enabled in accordance with an embodiment.

FIG. 15 shows a placement of displacement component samples in a displacement video frame when reversible packing is enabled in accordance with an embodiment.

In some embodiments, referring to FIG. 15, the size of the v-mesh packing block may be smaller than the packing super block size or equivalently the codec basic block size, and the codec basic block size may be an integer multiple (both in terms of rows and columns) of the v-mesh packing block size, where the integer may be equal to or greater than 1. In this scenario, a subblock scan may be used to go from a v-mesh packing block to the packing superblock. In some embodiments, the LOD samples may be placed using a reverse Morton scan in a v-mesh packing block. Then, the packing blocks may be placed within the packing super block using reverse raster scan. Then, the packing super blocks may be placed in the displacement video frame using reverse raster scan. Instead of reverse Morton and reverse raster scan, other scans may be used. Referring to FIG. 15, reversible packing is being used. In some embodiments, when reversible packing is disabled, forward Morton and raster scans may be used.

Hereinafter, a syntax and semantics with regards to the packing block and the packing super block will be described.

In some embodiments, as a requirement of bitstream conformance, the packing super block size may be an integer multiple of the packing block size in both horizontal and vertical direction, where the integer may be equal to or greater than 1. For example, the width of the packing super block may be an integer multiple of the width of the packing block and the height of the packing super block may be an integer multiple of the height of the packing block. In some embodiments, the encoder may choose the packing super block size to be equal to the codec block size. This condition may ensure that the boundaries of the codec blocks and V-Mesh packing blocks are aligned.

In WD 2.0 of VDMC (WD 2.0 of V-DMC", ISO/IEC JTC1/SC29/WG7 N00546, Online, January 2023), the packing block size is not being signaled. Hereinafter, however, signaling a syntax element indicating the size of the packing block size in the v-mesh bitstream will be described. In some embodiments, the packing block size may be restricted to be a power of 2 with a minimum size of 4. In this case the syntax are as shown in Table 1:

US 12,587,683 B2

27

28

TABLE 1

| Syntax | Descriptor |
|---|---|
| log2_ packing_block_size_minus2 | ue(v) |

The syntax element log 2_packing_block_size_minus2 plus 2 may indicate the size of the packing block size. The descriptor ue(v) may indicate unsigned integer 0-th order Exp-Golomb-coded syntax element with the left bit first. The packing block size blockSize may be derived as shown in Equation 2:

$$blockSize = 1 << (\log2\_packing\_block\_size\_minus2 + 2) \quad \text{Equation 2}$$

Instead of minimum size of 4 other powers of two may be chosen as minimum sizes. In some embodiments, when the minimum size is chosen to be 8, the santax element log 2_min_packing_block_size_minus3 may be signaled instead of the syntax element log 2_packing_block_size_minus2.

In addition, the packing super block size by indicating the difference in power of 2 with respect to the packing block size may be signaled. In some embodiments, packing super block size may be signaled by a syntax element log 2_diff_packing_super_block_size in the v-mesh bitstream as follows:

TABLE 2

| Syntax | Descriptor |
|---|---|
| log2_ diff_packing_super_block_size | ue(v) |

The syntax element log 2_diff_packing_super_block_size may indicate the size of the packing super block size. The packing super block size suoperBlockSize may be derived as shown in Equation 3:

$$superBlockSize = \quad \text{Equation 3}$$
$$(1 << (\log2\_diff\_packing\_super\_block\_size) * blockSize)$$

In some embodiments, the number of displacement coefficients in each LOD may be signaled to the decoder 500 in the bitstreams. These can be signaled at the sequence level, mesh frame level, sub-mesh level or as metadata in SEI messages, etc. In some embodiments, the number of displacement coefficients in each LOD may be used by the decoder 500 to determine the end of LODs. This may enable the decoder 500 to decode LODs up to any level it wants.

In some embodiments, the v-mesh bitstream may include an Atlas sequence parameter set extension raw byte sequence payload (RBSP). The syntax of the Atlas sequence parameter set extension RBSP is as shown in the following Table 3:

TABLE 3

| | Descriptor |
|---|---|
| asps_vmc_extension( ) { | |
| ... | |
|    asps_vmc_ext_direct_attribute_projection_enabled_flag[ i ] | u(1) |
|   } | |
|   asps_vmc_ext_packing_method | u(1) |
|   asps_vmc_ext_1D_displacement_flag | u(1) |
| } | |

The syntax element asps_vmc_ext_packing_method may specify whether the displacement component samples are packed in ascending order or in descending order. For example, the syntax element asps_vmc_ext_packing-_method equal to 0 may specify that the displacement component samples are packed in ascending order. The syntax element asps_vmc_ext_packing_method equal to 1 may specify that the displacement component samples are packed in descending order.

When the syntax element asps_vmc_ext_packing_method indicates that the displacement component samples are packed in ascending order, scan order of the packing blocks may be forward. When the syntax element asps_vmc_ext_packing_method indicates that the displacement component samples are packed in descending order, scan order of the packing blocks may be reverse or backward.

The syntax element asps_vmc_ext_1D_displacement_flag may specify whether only a single component of the displacement is present in the compressed geometry video or three components of the displacement are present in the compressed geometry video. For example, the syntax element asps_vmc_ext_1D_displacement_flag equal to 1 may specify that only the normal (or x) component of the displacement is present in the compressed geometry video. The remaining two components may be inferred to be 0. The syntax element asps_vmc_ext_1D_displacement_flag equal to 0 may specify that all 3 components of the displacement are present in the compressed geometry video.

Hereinafter, operation of the image unpacker 523 performing an inverse image packing of wavelet coefficients will be described in accordance with FIG. 16 to FIG. 17.

Figure 16:
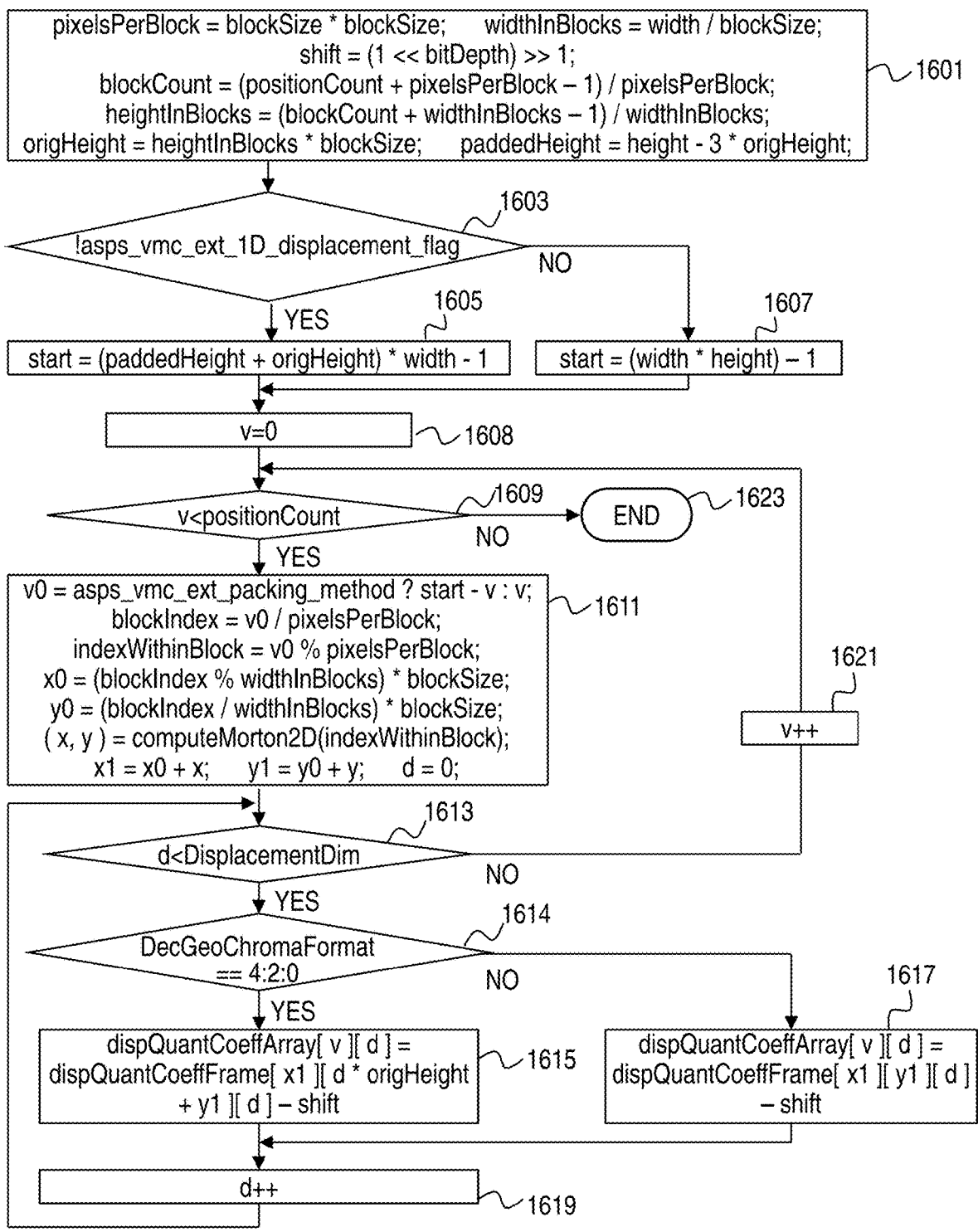
FIG. 16 is a flowchart showing operation of the image unpacker 523 in accordance with an embodiment.

FIG. 16 is a source code showing operation of the image unpacker 523 in accordance with an embodiment. FIG. 17 is a flowchart showing operation of the image unpacker 523 in accordance with the embodiment shown in FIG. 16.

The image unpacker 523 may receive a variable width, a variable height, a variable bitDepth, a 3D array dispQuant-CoeffFrame, a variable blockSize, and a variable position-Count as inputs. The variable width may indicate the width of the displacements video frame. The variable height may indicate the height of the displacements video frame. The variable bitDepth may indicate the bit depth of the displacements video frame. The 3D array dispQuantCoeffFrame may be a 3D array of size width×height×3 indicating the packed quantized displacement wavelet coefficients. The variable blockSize may indicate the size of the packing blocks. The variable positionCount may indicate the number of positions in the subdivided submesh.

The image unpacker 523 may output a 2D array dispQuantCoeffArray. The 2D array dispQuantCoeffArray may be a 2D array of size positionCount×3 indicating the quantized displacement wavelet coefficients.

The image unpacker 523 may set a variable DisplacementDim based on the syntax element aspsvmc_ext_1D_displacement_flag. For example, the image unpacker 523 may set the variable DisplacementDim equal to 1, if the syntax element asps_vmc_ext_1D_displacement_flag is equal to 1. Otherwise, if the syntax element asps_vmc_ext_1D_displacement_flag is equal to 0, the image unpacker 523 may set the variable DisplacementDim equal to 3. The variable DisplacementDim may indicate the number of dimensions of the displacement field.

The image unpacker 523 may initialize the 2D array dispQuantCoeffArray to 0.

The image unpacker 523 may perform an inverse image packing of wavelet coefficients as shown in Table 4

TABLE 4

```
pixelsPerBlock = blockSize * blockSize
widthInBlocks = width / blockSize
shift = (1 << bitDepth) >> 1
blockCount = (positionCount + pixelsPerBlock − 1) / pixelsPerBlock
heightInBlocks = (blockCount + widthInBlocks − 1) / widthInBlocks
origHeight = heightInBlocks * blockSize
paddedHeight = height − 3 * origHeight
if (!asps_vmc_ext_1D_displacement_flag)
    start = (paddedHeight + origHeight) * width − 1
Else
    start = (width * height) − 1
for( v = 0; v < positionCount; v++ ) {
    v0 = asps_vmc_ext_packing_method ? start − v : v
    blockIndex = v0 / pixelsPerBlock
    indexWithinBlock = v0 % pixelsPerBlock
    x0 = (blockIndex % widthInBlocks) * blockSize
    y0 = (blockIndex / widthInBlocks) * blockSize
    ( x, y ) = computeMorton2D(indexWithinBlock)
    x1 = x0 + x
    y1 = y0 + y
    for( d = 0; d < DisplacementDim; d++ )
        if (DecGeoChromaFormat == 4:2:0)
            dispQuantCoeffArray[ v ][ d ] =
            dispQuantCoeffFrame[ x1 ][ d * origHeight +
y1 ][ d ] − shift
        Else
            dispQuantCoeffArray[ v ][ d ] =
            dispQuantCoeffFrame[ x1 ][ y1 ][ d ] − shift
}
```

Referring to FIG. 16, at operation 1601, the image unpacker 523 may calculate variables pixelsPerBlock, widthInBlocks, shift, blockCount, heightInBlocks, origHeight, and paddedHeight as shown in Table 4. For example, the image unpacker 523 may calculate the variable pixelsPerBlock based on the variable blockSize. The variable pixelsPerBlock may indicate the number of pixels in a packing block. The image unpacker 523 may calculate the variable widthInBlocks based on variables width and blockSize. The variable widthInBlocks may indicate the width of the displacements video frame in units of packing blocks. The image unpacker 523 may calculate the variable shift based the variable bitDepth. The image unpacker 523 may calculate the variable blockCount based on the variables positionCount and pixelsPerBlock. The variable blockCount may indicate the number of packing blocks containing quantized displacement wavelet coefficients. The image unpacker 523 may calculate the variable heightInBlocks based on the variables blockCount and widthInBlocks. The variable heightInBlocks may indicate the height of the upper area in units of packing blocks referring to FIGS. 7 to 11. The image unpacker 523 may calculate the variable origHeight based on the variables heightInBlocks and block-Size. The variable origHeight may indicates the number of rows of samples in the lower area referring to FIGS. 7 to 11. The image unpacker 523 may calculate the variable pad-dedHeight based the variable origHeight. The variable pad-dedHeight may indicates the number of padded rows.

At operation 1603, the image unpacker 523 may determine whether the syntax element asps_vmc_ext_1D_dis-placement_flag is equal to 1.

If the syntax element asps_vmc_ext_1D_displacement_flag is equal to 0, i.e., if the syntax element asps_vmc_ext_1D_displacement_flag indicates that three components of the displacement are present in the compressed geometry video, the image unpacker 523 may calculate a variable start based on the variables paddedHeight, origHeight, and width at operation 1605.

If the syntax element asps_vmc_ext_1D_displacement_flag is equal to 1, i.e., if the syntax element asps_vmc_ext_1D_displacement_flag indicates that only a single component of the displacement is present in the compressed geometry video, the image unpacker 523 may calculate a variable start based on the variables width and height at operation 1607.

At operation 1608, the image unpacker 523 may initialize a variable v to 0. The variable v may indicate an index of a current quantized displacement wavelet coefficient, in particularly, in the array dispQuantCoeffArray of quantized displacement wavelet coefficients.

At operation 1609, the image unpacker 523 may determine whether the variable v is less than the variable posi-tionCount.

If the variable v is less than the variable positionCount, the image unpacker 523 may calculate variables v0, block-Index, indexWithinBlock, x0, y0, x, y, x1 and y1, at operation 1611. The variables may be calculated as shown in Table 4. For example, the image unpacker 523 may calculate the variable v0 based on the syntax element asps_vmc_ext_packing_method and variables start and v. The variable v0 may indicate an index of the current quantized displacement wavelet coefficient considering the syntax element asps_vmc_ext_packing_method. The image unpacker 523 may determine the value of the variable start minus the value of the variable v as the variable v0 if the syntax element asps_vmc_ext_packing_method is equal to 1. The image unpacker 523 may determine the value of the variable v as the variable v0 if the syntax element asps_vmc_ext_pack-ing_method is equal to 0. The image unpacker 523 may calculate the variable blockIndex based on the variables v and pixelsPerBlock. The variable blockIndex may indicate an index of a current packing block containing the current quantized displacement wavelet coefficient. The image unpacker 523 may calculate the variable indexWithinBlock based on the variables v and pixelsPerBlock. The variable indexWithinBlock may indicate an index of the current quantized displacement wavelet coefficient within the current packing block. The image unpacker 523 may calculate the variable x0 based on the variables blockIndex, widthIn-Blocks and blockSize. The image unpacker 523 may calculate the variable y0 based on the variables blockIndex, widthInBlocks and blockSize. The variables x0 and y0 may indicate a location of the top-left sample of the current packing block which the current quantized displacement wavelet coefficient belongs to. The image unpacker 523 may calculate variables x and y by using a function computeMorton2D. The variable x and y may indicate a location of the current quantized displacement wavelet coefficient within the current packing block. The image unpacker 523 may calculate the variable x1 based on the variables x0 and x. The image unpacker 523 may calculate the variable y1 based on the variables y0 and y. The variable x1 and y1 may indicate a location of the current quantized displacement wavelet coefficient within the displacement video frame. The image unpacker 523 may initialize a variable d to 0. The variable d may indicate a dimension of a component of the current quantized displacement wavelet coefficient.

The function computeMorton2D(i) may be defined as shown in the following Function 1.

---

Function 1

---

```
(x, y) = computeMorton2D( i ) {
    x = extracOddBits( i >> 1 )
    y = extracOddBits( i )
}
```

---

The function extracOddBits(x) may be defined as shown in the following Function 2.

---

Function 2

---

```
x = extracOddBits( x ) {
    x = x & 0x55555555
    x = (x | (x >> 1)) & 0x33333333
    x = (x | (x >> 2)) & 0x0F0F0F0F
    x = (x | (x >> 4)) & 0x00FF00FF
    x = (x | (x >> 8)) & 0x0000FFFF
}
```

---

At operation 1613, the image unpacker 523 may determine whether the variable d is less than the variable DisplacementDim.

If the variable d is less than the variable DisplacementDim, the image unpacker 523 may determine whether the DecGeoChromaFormat is equal to 4:2:0 at operation 1614.

If the DecGeoChromaFormat is equal to 4:2:0, the image unpacker 523 may convert the 2D array dispQuantCoeffArray of quantized displacement wavelet coefficients to the displacement video frame dispQuantCoeffFrame based on the variables v, d, x1, y1, origHeight, and shift, at operation 1615. In some embodiments, the image unpacker 523 may set the v-th quantized displacement wavelet coefficient for the current dimension d in the the 2D array dispQuantCoeffArray equal to a quantized displacement wavelet coefficient located at (x1, d*origHeight+y1) for the current dimension d in the displacement video frame dispQuantCoeffFrame minus the variable shift.

If the DecGeoChromaFormat is not equal to 4:2:0, the image unpacker 523 may convert the 2D array dispQuantCoeffArray of quantized displacement wavelet coefficients to the displacement video frame dispQuantCoeffFrame based on the variables v, d, x1, y1, and shift, at operation 1617. In some embodiments, the image unpacker 523 may set the v-th quantized displacement wavelet coefficient for the current dimension d in the the 2D array dispQuantCoeffArray equal to a quantized displacement wavelet coefficient located at (x1, y1) for the current dimension d in the displacement video frame dispQuantCoeffFrame minus the variable shift.

At operation 1619, the image unpacker 523 may increase the variable d by 1 and then go to the operation 1613.

If the variable d is not less than the variable DisplacementDim, the image unpacker 523 may increase the variable v by 1 at operation 1621 and then go to the operation 1609.

If the variable v is not less than the variable positionCount, the image unpacker 523 may output the 2D array dispQuantCoeffArray at operation 1623.

Figure 17:
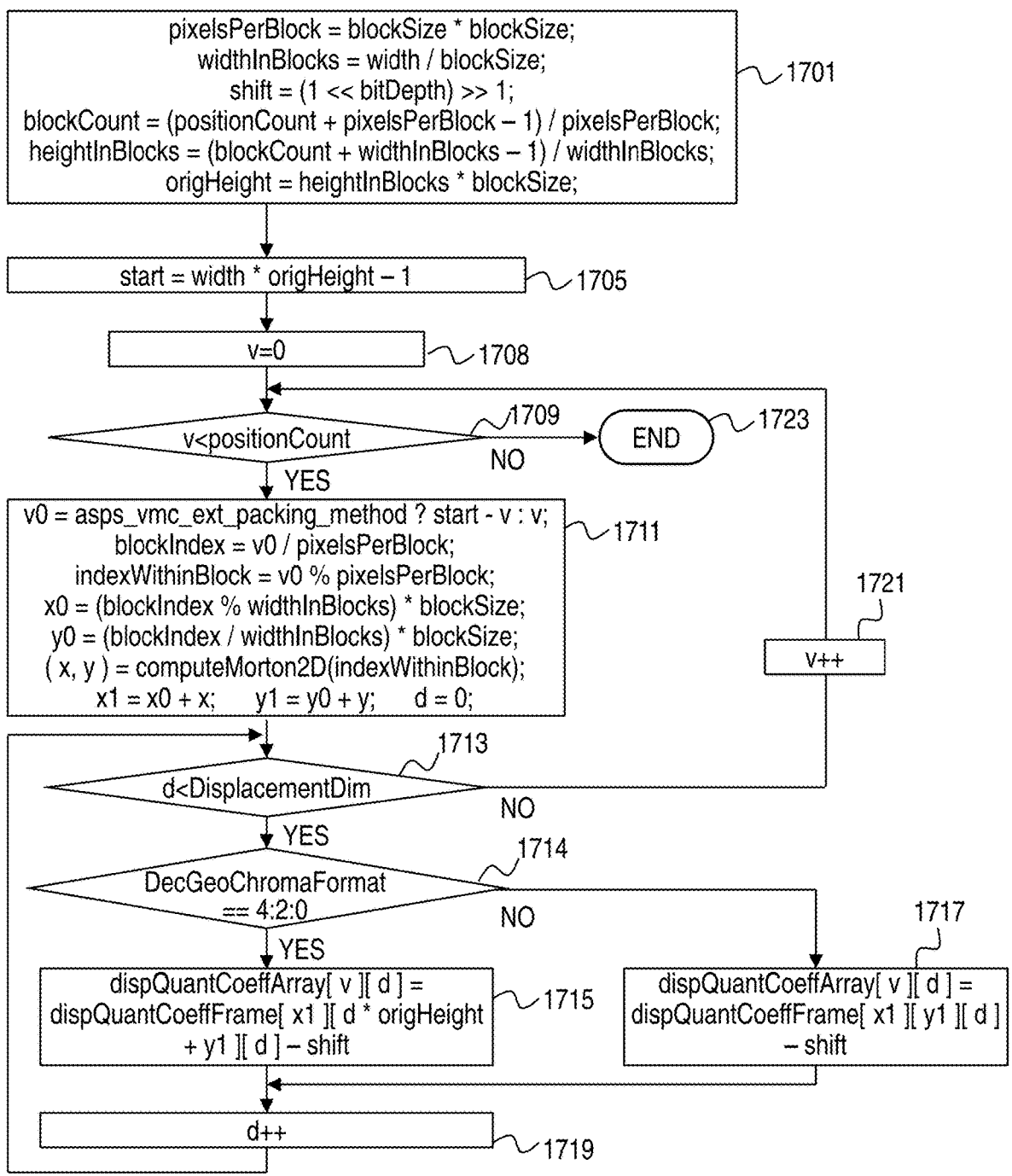
FIG. 17 is a flowchart showing operation of the image unpacker 523 in accordance with an embodiment.

FIG. 17 is a flowchart showing operation of the image unpacker 523 in accordance with an embodiment.

Unless otherwise stated, the description of FIG. 16 will be applied to the embodiment of FIG. 17.

The image unpacker 523 may perform an inverse image packing of wavelet coefficients as shown in Table 5.

---

TABLE 5

---

```
pixelsPerBlock = blockSize * blockSize
widthInBlocks = width / blockSize
shift = (1 << bitDepth) >> 1
blockCount = (positionCount + pixelsPerBlock − 1) / pixelsPerBlock
heightInBlocks = (blockCount + widthInBlocks − 1) / widthInBlocks
origHeight = heightInBlocks * blockSize
start = width * origHeight − 1
for( v = 0; v < positionCount; v++ ) {
    v0 = asps_vmc_ext_packing_method ? start − v : v
    blockIndex = v0 / pixelsPerBlock
    indexWithinBlock = v0 % pixelsPerBlock
    x0 = (blockIndex % widthInBlocks) * blockSize
    y0 = (blockIndex / widthInBlocks) * blockSize
    ( x, y ) = computeMorton2D(indexWithinBlock)
    x1 = x0 + x
    y1 = y0 + y
    for( d = 0; d < DisplacementDim; d++ )
        if (DecGeoChromaFormat == 4:2:0)
            dispQuantCoeffArray[ v ][ d ] =
            dispQuantCoeffFrame[ x1 ][ d * origHeight +
y1 ][ 0 ] − shift
        else
            dispQuantCoeffArray[ v ][ d ] =
            dispQuantCoeffFrame[ x1 ][ y1 ][ d ] − shift
}
```

---

Referring to FIG. 17, at operation 1701, the image unpacker 523 may calculate variables pixelsPerBlock, widthInBlocks, shift, blockCount, heightInBlocks, and origHeight as shown in Table 5. For example, the image unpacker 523 may calculate the variable pixelsPerBlock based on the variable blockSize. The variable pixelsPerBlock may indicate the number of pixels in a packing block. The image unpacker 523 may calculate the variable widthInBlocks based on variables width and blockSize. The variable widthInBlocks may indicate the width of the displacements video frame in units of packing blocks. The image unpacker 523 may calculate the variable shift based the variable bitDepth. The image unpacker 523 may calculate the variable blockCount based on the variables positionCount and pixelsPerBlock. The variable blockCount may indicate the number of packing blocks containing quantized displacement wavelet coefficients. The image unpacker 523 may calculate the variable heightInBlocks based on the variables blockCount and widthInBlocks. The variable heightInBlocks may indicate the height of the upper area in units of packing blocks referring to FIGS. 7 to 11. The image unpacker 523 may calculate the variable origHeight based on the variables heightInBlocks and blockSize. The variable origHeight may indicates the number of rows of samples in the upper area referring to FIGS. 7 to 11.

At operation 1705, the image unpacker 523 may calculate a variable start based on the variables origHeight and width.

At operation 1708, the image unpacker 523 may initialize a variable v to 0. The variable v may indicate an index of a current quantized displacement wavelet coefficient, in particular, in the array dispQuantCoeffArray of quantized displacement wavelet coefficients.

At operation 1709, the image unpacker 523 may determine whether the variable v is less than the variable positionCount.

If the variable v is less than the variable positionCount, the image unpacker 523 may calculate variables v0, blockIndex, indexWithinBlock, x0, y0, x, y, x1 and y1 at operation 1711. The variables may be calculated as shown in Table 5. For example, the image unpacker 523 may calculate the variable v0 based on the syntax element asps_vmc_ext_packing_method and variables start and v. The variable v0 may indicate an index of the current quantized displacement wavelet coefficient considering the syntax element asps_vmc_ext_packing_method. The image unpacker 523 may determine the value of the variable start minus the value of the variable v as the variable v0 if the syntax element asps_vmc_ext_packing_method is equal to 1. The image unpacker 523 may determine the value of the variable v as the variable v0 if the syntax element asps_vmc_ext_packing_method is equal to 0. The image unpacker 523 may calculate the variable blockIndex based on the variables v and pixelsPerBlock. The variable blockIndex may indicate an index of a current packing block containing the current quantized displacement wavelet coefficient. The image unpacker 523 may calculate the variable indexWithinBlock based on the variables v and pixelsPerBlock. The variable indexWithinBlock may indicate an index of the current quantized displacement wavelet coefficient within the current packing block. The image unpacker 523 may calculate the variable x0 based on the variables blockIndex, widthInBlocks and blockSize. The image unpacker 523 may calculate the variable y0 based on the variables blockIndex, widthInBlocks and blockSize. The variables x0 and y0 may indicate a location of the top-left sample of the current packing block which the current quantized displacement wavelet coefficient belongs to. The image unpacker 523 may calculate variables x and y by using a function computeMorton2D. The variable x and y may indicate a location of the current quantized displacement wavelet coefficient within the current packing block. The image unpacker 523 may calculate the variable x1 based on the variables x0 and x. The image unpacker 523 may calculate the variable y1 based on the variables y0 and y. The variable x1 and y1 may indicate a location of the current quantized displacement wavelet coefficient within the displacement video frame. The image unpacker 523 may initialize the variable d to 0. The variable d may indicate a dimension of a component of the current quantized displacement wavelet coefficient.

At operation 1713, the image unpacker 523 may determine whether the variable d is less than the variable DisplacementDim.

If the variable d is less than the variable DisplacementDim, the image unpacker 523 may determine whether the DecGeoChromaFormat is equal to 4:2:0 at operation 1714.

If the DecGeoChromaFormat is equal to 4:2:0, the image unpacker 523 may convert the 2D array dispQuantCoeffArray of quantized displacement wavelet coefficients to the displacement video frame dispQuantCoeffFrame based on the variables v, d, x1, y1, origHeight, and shift at operation 1715. In some embodiments, the image unpacker 523 may set the v-th quantized displacement wavelet coefficient for the current dimension d in the the 2D array dispQuantCoeffArray equal to a quantized displacement wavelet coefficient located at (x1, d*origHeight+y1) for the current dimension d in the displacement video frame dispQuantCoeffFrame minus the variable shift.

If the DecGeoChromaFormat is not equal to 4:2:0, the image unpacker 523 may convert the 2D array dispQuantCoeffArray of quantized displacement wavelet coefficients to the displacement video frame dispQuantCoeffFrame based on the variables v, d, x1, y1, and shift at operation 1717. In some embodiments, the image unpacker 523 may set the v-th quantized displacement wavelet coefficient for the current dimension d in the the 2D array dispQuantCoeffArray equal to a quantized displacement wavelet coefficient located at (x1, y1) for the current dimension d in the displacement video frame dispQuantCoeffFrame minus the variable shift.

At operation 1719, the image unpacker 523 may increase the variable d by 1 and then go to the operation 1713.

If the variable d is not less than the variable DisplacementDim, the image unpacker 523 may increase the variable v by 1 at operation 1721 and then go to the operation 1709.

If the variable v is not less than the variable positionCount, the image unpacker 523 may output the 2D array dispQuantCoeffArray at operation 1723.

The various illustrative blocks, units, modules, components, methods, operations, instructions, items, and algorithms may be implemented or performed with a processing circuitry.

A reference to an element in the singular is not intended to mean one and only one unless specifically so stated, but rather one or more. For example, "a" module may refer to one or more modules. An element proceeded by "a," "an," "the," or "said" does not, without further constraints, preclude the existence of additional same elements.

Headings and subheadings, if any, are used for convenience only and do not limit the subject technology. The term "exemplary" is used to mean serving as an example or illustration. To the extent that the term "include," "have," "carry," "contain," or the like is used, such term is intended to be inclusive in a manner similar to the term "comprise" as "comprise" is interpreted when employed as a transitional word in a claim. Relational terms such as first and second and the like may be used to distinguish one entity or action from another without necessarily requiring or implying any actual such relationship or order between such entities or actions.

Phrases such as an aspect, the aspect, another aspect, some aspects, one or more aspects, an implementation, the implementation, another implementation, some implementations, one or more implementations, an embodiment, the embodiment, another embodiment, some embodiments, one or more embodiments, a configuration, the configuration, another configuration, some configurations, one or more configurations, the subject technology, the disclosure, the present disclosure, other variations thereof and alike are for convenience and do not imply that a disclosure relating to such phrase(s) is essential to the subject technology or that such disclosure applies to all configurations of the subject technology. A disclosure relating to such phrase(s) may apply to all configurations, or one or more configurations. A disclosure relating to such phrase(s) may provide one or more examples. A phrase such as an aspect or some aspects may refer to one or more aspects and vice versa, and this applies similarly to other foregoing phrases.

A phrase "at least one of" preceding a series of items, with the terms "and" or "or" to separate any of the items, modifies the list as a whole, rather than each member of the list. The phrase "at least one of" does not require selection of at least one item; rather, the phrase allows a meaning that includes at least one of any one of the items, and/or at least one of any combination of the items, and/or at least one of each of the items. By way of example, each of the phrases "at least one of A, B, and C" or "at least one of A, B, or C" refers to only A, only B, or only C; any combination of A, B, and C; and/or at least one of each of A, B, and C.

It is understood that the specific order or hierarchy of steps, operations, or processes disclosed is an illustration of exemplary approaches. Unless explicitly stated otherwise, it is understood that the specific order or hierarchy of steps, operations, or processes may be performed in different order. Some of the steps, operations, or processes may be performed simultaneously or may be performed as a part of one or more other steps, operations, or processes. The accompanying method claims, if any, present elements of the various steps, operations or processes in a sample order, and are not meant to be limited to the specific order or hierarchy presented. These may be performed in serial, linearly, in parallel or in different order. It should be understood that the described instructions, operations, and systems can generally be integrated together in a single software/hardware product or packaged into multiple software/hardware products.

The disclosure is provided to enable any person skilled in the art to practice the various aspects described herein. In some instances, well-known structures and components are shown in block diagram form in order to avoid obscuring the concepts of the subject technology. The disclosure provides various examples of the subject technology, and the subject technology is not limited to these examples. Various modifications to these aspects will be readily apparent to those skilled in the art, and the principles described herein may be applied to other aspects.

All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112, sixth paragraph, unless the element is expressly recited using a phrase means for or, in the case of a method claim, the element is recited using the phrase step for.

The title, background, brief description of the drawings, abstract, and drawings are hereby incorporated into the disclosure and are provided as illustrative examples of the disclosure, not as restrictive descriptions. It is submitted with the understanding that they will not be used to limit the scope or meaning of the claims. In addition, in the detailed description, the description may provide illustrative examples and the various features may be grouped together in various implementations for the purpose of streamlining the disclosure. This method of disclosure is not to be interpreted as reflecting an intention that the claimed subject matter requires more features than are expressly recited in each claim. Rather, as the following claims reflect, inventive subject matter lies in less than all features of a single disclosed configuration or operation. The following claims are hereby incorporated into the detailed description, with each claim standing on its own as a separately claimed subject matter.

The embodiments are provided solely as examples for understanding the invention. They are not intended and are not to be construed as limiting the scope of this invention in any manner. Although certain embodiments and examples have been provided, it will be apparent to those skilled in the art based on the disclosures herein that changes in the embodiments and examples shown may be made without departing from the scope of this invention.

The claims are not intended to be limited to the aspects described herein, but are to be accorded the full scope consistent with the language claims and to encompass all legal equivalents. Notwithstanding, none of the claims are intended to embrace subject matter that fails to satisfy the requirements of the applicable patent law, nor should they be interpreted in such a way.

What is claimed is:

1. An apparatus comprising:
a communication interface configured to receive a compressed bitstream including an encoded displacements bitstream and packing method information indicating whether displacement component samples are packed in ascending order or in descending order, wherein the displacement component samples are packed in ascending order when the packing method information is equal to a first value, and the displacement component samples are packed in descending order when the packing method information is equal to a second value, wherein the first value is 0 and the second value is 1; and
a processor operably coupled to the communication interface, the processor configured to cause:
decoding the packing method information;
video-decoding the encoded displacements bitstream to generate a displacement video frame;
image-unpacking the displacement video frame to generate an array of quantized displacement wavelet coefficients, wherein the displacement video frame includes padding at a lower area of the displacement video frame irrespective of whether the displacement component samples are packed in descending order;
inverse-quantizing the array of quantized displacement wavelet coefficients to generate displacement wavelet coefficients; and
inverse-wavelet-transforming the displacement wavelet coefficients to generate displacement component samples.

2. The apparatus of claim 1, wherein, irrespective of whether the packing method information indicates that the displacement component samples are packed in descending order, an upper area of the displacement video frame includes quantized displacement wavelet coefficients and the lower area of the displacement video frame does not include any quantized displacement wavelet coefficient and includes samples for padding.

3. The apparatus of claim 2, wherein image-unpacking the displacement video frame starts from a bottom-right block of the upper area if the packing method information indicates that the displacement component samples are packed in descending order.

4. The apparatus of claim 3, wherein the bottom-right block of the upper area includes quantized displacement wavelet coefficients belonging to a lowest level of detail (LOD).

5. The apparatus of claim 1, wherein a plurality of packing blocks are placed in the displacement video frame.

6. The apparatus of claim 5, wherein the plurality of packing blocks includes one or more non-padded blocks and a partially padded block, each of the one or more non-padded blocks include quantized displacement wavelet coefficients belonging to a first level of detail (LOD) and do not include any samples for padding, and the partially padded block includes one or more quantized displacement wavelet coefficients belonging to the first LOD and one or more samples for padding.

7. The apparatus of claim 6, wherein the one or more non-padded blocks precede the partially padded block in scan order of blocks, when the packing method information indicates that the displacement component samples are packed in descending order.

8. The apparatus of claim 7, wherein the scan order of blocks is reverse raster scan.

9. The apparatus of claim 6, wherein the partially padded block precedes one or more fully padded blocks, each of the one or more fully padded blocks does not include any quantized displacement wavelet coefficient to be decoded and includes samples for padding.

10. The apparatus of claim 6, wherein each of the one or more non-padded blocks is not allowed to include quantized displacement wavelet coefficients belonging to a second LOD, the second LOD being different from the first LOD.

11. The apparatus of claim 1, wherein a plurality of packing blocks are placed in the displacement video frame and a size of the plurality of packing blocks is an integer multiple of a size of a unit block used for configuring a partially or independently decodable region for a video coding standard used by the video-decoding, the integer being equal to or greater than 1.

12. The apparatus of claim 11, wherein the partially or independently decodable region for a video coding standard used by the video-decoding is not allowed to include quantized displacement wavelet coefficients belonging to two or more levels of detail.

13. The apparatus of claim 11, wherein a size of the unit block is a size of a coding tree unit specified in the video-decoding, when the video-decoding uses High Efficiency Video Coding (HEVC).

14. The apparatus of claim 11, wherein a size of the unit block is a size of a macroblock specified in the video-decoding, when the video-decoding uses Advanced Video Coding (AVC).

15. A method comprising:

receiving a compressed bitstream including an encoded displacements bitstream and packing method information indicating whether displacement component samples are packed in ascending order or in descending order, wherein the displacement component samples are packed in ascending order when the packing method information is equal to a first value, and the displacement component samples are packed in descending order when the packing method information is equal to a second value, wherein the first value is 0 and the second value is 1;

decoding the packing method information;

video-decoding the encoded displacements bitstream to generate a displacement video frame;

image-unpacking the displacement video frame to generate an array of quantized displacement wavelet coefficients, wherein the displacement video frame includes padding at a lower area of the displacement video frame irrespective of whether the displacement component samples are packed in descending order;

inverse-quantizing the array of quantized displacement wavelet coefficients to generate displacement wavelet coefficients; and inverse-wavelet-transforming the displacement wavelet coefficients to generate displacement component samples.

16. An apparatus comprising:

a communication interface; and a processor operably coupled to the communication interface, the processor configured to cause:

encoding packing method information indicating whether displacement component samples are packed in ascending order or in descending order, wherein the displacement component samples are packed in ascending order when the packing method information is equal to a first value, and the displacement component samples are packed in descending order when the packing method information is equal to a second value, wherein the first value is 0 and the second value is 1;

wavelet-transforming displacement component samples to generate displacement wavelet coefficients;

quantizing the displacement wavelet coefficients to generate an array of quantized displacement wavelet coefficients;

image-packing the array of quantized displacement wavelet coefficients to generate a displacement video frame, wherein padding is added at a lower area of the displacement video frame irrespective of whether the displacement component samples are packed in descending order;

video-encoding the displacement video frame to generate an encoded displacements bitstream; and combining the encoded packing method information and the encoded displacements bitstream into a compressed bitstream.

17. The apparatus of claim 16, wherein, when the packing method information indicates that the displacement component samples are packed in descending order, an upper area of the displacement video frame includes quantized displacement wavelet coefficients and a lower area of the displacement video frame does not include any quantized displacement wavelet coefficient and includes samples for padding.

18. The apparatus of claim 17, wherein image-packing the displacement video frame starts from a bottom-right block of the upper area if the packing method information indicates that the displacement component samples are packed in descending order.

19. The apparatus of claim 18, wherein the bottom-right block of the upper area includes quantized displacement wavelet coefficients belonging to a lowest level of detail (LOD).

20. The apparatus of claim 16, wherein a plurality of packing blocks are placed in the displacement video frame and a size of the plurality of packing blocks is an integer multiple of a size of a unit block used for configuring a partially or independently decodable region for a video coding standard used by video-decoding, the integer being equal to or greater than 1.

* * * * *